US012736112B2

(12) United States Patent
Tholen et al.

(10) Patent No.: US 12,736,112 B2
(45) Date of Patent: Sep. 15, 2026

(54) ASSISTED MECHANICAL CONTINUOUSLY VARIABLE TRANSMISSION

(71) Applicant: Polaris Industries Inc., Medina, MN (US)

(72) Inventors: Ryan A. Tholen, Wyoming, MN (US); Dylan T. Truskolaski, Wyoming, MN (US); Maverick J. Klotz, Wyoming, MN (US); Bret A. Dahme, Wyoming, MN (US); Garrett Schmidt, Wyoming, MN (US); Neil Paulson, Wyoming, MN (US); Zacharey J. Hussong, Derrimut (AU); Lucas R. Salfer, Roseau, MN (US); Cole A. Maxwell, Roseau, MN (US); James H. Buchwitz, Roseau, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 19/034,730

(22) Filed: Jan. 23, 2025

(65) Prior Publication Data

US 2025/0237293 A1 Jul. 24, 2025

Related U.S. Application Data

(60) Provisional application No. 63/623,857, filed on Jan. 23, 2024.

(51) Int. Cl.
*F16H 9/14* (2006.01)
*B60K 17/06* (2006.01)
(Continued)

(52) U.S. Cl.
CPC ............... *F16H 9/14* (2013.01); *B60K 17/06* (2013.01); *F16H 61/662* (2013.01); *F16H 63/3023* (2013.01)

(58) Field of Classification Search
CPC ...... F16H 9/14; F16H 61/662; F16H 63/3023; F16H 63/067; F16H 63/065;
(Continued)

(56) References Cited

U.S. PATENT DOCUMENTS 2,260,798 A * 10/1941 Burns ...................... B62M 9/04 474/15
2,779,203 A * 1/1957 Eubanks .................. F16H 9/16 474/28
(Continued)

FOREIGN PATENT DOCUMENTS

WO 2014059258 A1 4/2014

*Primary Examiner* — Henry Y Liu
(74) *Attorney, Agent, or Firm* — Merchant & Gould P.C.

(57) ABSTRACT

A continuously variable transmission includes a driven clutch, a drive clutch operably coupled to the driven clutch, the drive clutch including a stationary sheave, a moveable sheave positioned adjacent to the stationary sheave along a common axis of defined by a shaft and operable to translate axially relative to the stationary sheave, and a load member, a belt extending between the drive clutch and the driven clutch, and an actuator coupled to the moveable sheave of the drive clutch, the actuator operable to apply a force to the moveable sheave in a direction substantially along or parallel to the common axis.

19 Claims, 36 Drawing Sheets

(51) Int. Cl.
*F16H 61/662* (2006.01)
*F16H 63/30* (2006.01)

(58) Field of Classification Search
CPC ..... F16H 2061/2853; F16H 2061/2884; F16H 2061/66295; F16H 55/56; F16H 55/563; F16H 61/30; F16H 2063/3063; B60K 17/06; B60K 17/08
See application file for complete search history.

(56) References Cited

U.S. PATENT DOCUMENTS 3,017,783 A * 1/1962 Van Der Brugghen et al. ............ F16H 61/66263 474/14
3,052,132 A * 9/1962 Karig .................... F16H 61/662 474/18
3,081,642 A * 3/1963 Emerson ............... F16H 61/662 474/28
3,280,649 A * 10/1966 Bruet ...................... F16H 55/56 474/45
3,526,150 A * 9/1970 Iverson ................... F16H 55/56 474/28
3,557,640 A * 1/1971 Hendriks et al. ............................ F16H 61/66259 192/222
3,600,961 A * 8/1971 Rattunde ................... F16H 9/18 477/46
3,653,283 A * 4/1972 Betz .................. F16H 61/66263 474/18
3,685,365 A * 8/1972 Bauer ..................... F16H 55/56 474/28
3,698,256 A * 10/1972 Albertson ............. F16H 55/563 474/14
3,704,634 A * 12/1972 Schrodt ................. F16H 63/065 474/18
3,771,378 A * 11/1973 Knobel ............. F16H 61/66245 474/14
3,782,213 A * 1/1974 Rattunde ........... F16H 61/66272 474/16
3,801,214 A * 4/1974 Jonsson .................. F04D 23/00 415/72
4,152,947 A * 5/1979 van Deursen ..... F16H 61/66259 474/11
4,229,988 A * 10/1980 Rattunde ................... F16H 9/18 474/28
4,284,408 A * 8/1981 Boer ................. F16H 61/66245 474/14
4,292,031 A * 9/1981 Rattunde ........... F16H 61/66272 474/18
4,464,145 A * 8/1984 Kawamoto ............... F16H 9/18 474/18
4,469,333 A * 9/1984 Schlicker ............ F16L 27/0828 277/585
4,753,627 A * 6/1988 Kawamoto ....... F16H 61/66259 474/18
5,180,339 A * 1/1993 Haley ..................... F16H 55/56 474/28
5,334,104 A * 8/1994 Schuermans ..... F16H 61/66272 474/28
5,399,123 A * 3/1995 Blackburn ............ F16H 55/563 474/18
5,439,419 A * 8/1995 Yamada ................ F16H 63/065 474/18
5,605,513 A * 2/1997 Van Der Hardt Aberson ............. F16H 57/0489 474/43
5,776,022 A * 7/1998 Schellekens .......... F16H 63/065 474/18
5,803,846 A * 9/1998 Yamada .................. F16H 55/56 474/18
5,879,253 A * 3/1999 Friedmann .............. F16H 59/14 474/18
5,960,924 A * 10/1999 Snyder .................... F16H 55/56 192/85.33
6,086,492 A * 7/2000 Nakano ................. F16H 55/563 477/44
6,089,999 A * 7/2000 Imaida .................... F16H 55/56 474/18
6,152,843 A * 11/2000 Murakami ............ F16H 63/065 474/28
6,174,253 B1 * 1/2001 Walter ............. F16H 61/66272 474/18
6,190,274 B1 * 2/2001 Walter ...................... F16H 9/06 474/28
6,234,925 B1 * 5/2001 Walter .................. F16H 63/065 474/18
6,280,357 B1 * 8/2001 Van Spijk ......... F16H 61/66272 474/16
6,394,920 B1 * 5/2002 Morlok ................... F16H 61/00 474/18
6,835,147 B2 * 12/2004 Iwata .................... F16H 61/143 474/18
6,846,255 B2 * 1/2005 Muller .................. F16H 63/065 474/18
6,962,542 B2 * 11/2005 Van Spijk .............. F16H 55/56 474/18
7,014,583 B2 * 3/2006 Diosi ................ F16H 61/66272 474/18
7,175,554 B2 * 2/2007 Van Spijk ......... F16H 61/66272 474/46
7,264,564 B2 * 9/2007 Walter .................... F16H 55/56 474/18
7,575,528 B2 * 8/2009 Plath ...................... F16H 55/56 474/46
7,686,715 B2 * 3/2010 Carlson ................. F16H 63/065 474/18
7,762,915 B2 * 7/2010 Kouta ..................... F16H 55/56 474/18
7,771,301 B2 * 8/2010 Kauffeldt ................ F16H 55/56 474/8
7,811,187 B2 * 10/2010 Koyama ............... F16H 63/065 474/46
8,029,395 B2 * 10/2011 Hokari .................. F16H 63/065 474/18
8,052,555 B2 * 11/2011 Muller .................... F16H 59/16 474/18
8,100,791 B2 * 1/2012 Yamaguchi ........... F16H 63/065 184/7.3
8,104,524 B2 1/2012 Manesh et al.
8,133,141 B2 * 3/2012 Kremer ................. F16H 63/065 474/18
8,147,364 B2 * 4/2012 Shioiri .............. F16H 61/66272 474/28
8,176,957 B2 5/2012 Manesh et al.
8,414,433 B2 * 4/2013 Kadokawa ................ F16H 9/18 474/18
8,517,872 B2 * 8/2013 Ogawa .................. F16H 63/065 474/28
8,562,463 B2 * 10/2013 Shioiri .............. F16H 61/66263 474/18
8,864,610 B2 * 10/2014 Kadokawa ................ F16H 9/18 474/8
9,017,193 B2 * 4/2015 Kadokawa .............. F16H 55/56 474/8
9,033,831 B2 * 5/2015 Kawakami ................ F16H 9/16 474/18
9,476,486 B2 * 10/2016 Hochmayr .......... F16H 61/6624
10,473,195 B2 * 11/2019 Duan ...................... F16H 9/125
11,662,020 B2 * 5/2023 Yagasaki ............... F16H 57/043 474/28
11,835,120 B2 * 12/2023 Hamm .................... F16H 55/56
2001/0044350 A1 * 11/2001 Nishigaya ............... F16H 55/56 474/18
2001/0049312 A1 * 12/2001 Warner ................. F16H 63/065 474/18

(56) References Cited

U.S. PATENT DOCUMENTS

2003/0092517 A1* 5/2003 Muller .................. F16H 63/065 474/18
2003/0232675 A1* 12/2003 Miyazaki ............ F16D 48/0206 474/18
2005/0181899 A1* 8/2005 Plath ................. F16H 61/66272 474/18
2005/0197221 A1* 9/2005 Nozawa ................ F16H 63/065 474/18
2005/0233844 A1* 10/2005 Kuroda ................... F16H 55/56 474/18
2005/0272539 A1* 12/2005 Kouta ................... F16H 63/065 474/18
2006/0009321 A1* 1/2006 Carlson ................. F16H 63/065 474/18
2006/0058130 A1* 3/2006 Vornehm ................ F16H 55/56 474/18
2006/0258493 A1* 11/2006 Kauffeldt ................ F16H 55/56 474/28
2009/0062044 A1* 3/2009 Shioiri .............. F16H 61/66263 474/28
2009/0105020 A1* 4/2009 Shioiri ................ F16K 15/1823 137/511
2009/0291788 A1* 11/2009 Hokari .................. F16H 63/065 474/28
2009/0298626 A1* 12/2009 Yamaguchi ........... F16H 63/065 474/28
2010/0120562 A1* 5/2010 Kadokawa ................ F16H 9/18 474/28
2010/0240480 A1* 9/2010 Ogawa .................. F16H 63/065 474/28
2012/0244974 A1* 9/2012 Tsuji ....................... F16H 55/56 474/28
2013/0324334 A1* 12/2013 Kawakami ................ F16H 9/16 474/28
2014/0031154 A1* 1/2014 Yoshida .................. F16H 9/125 474/8
2014/0128188 A1* 5/2014 Ouchida ................. F16H 61/00 474/28
2014/0378251 A1* 12/2014 Ishino ................... F16H 37/022 475/210
2015/0267792 A1* 9/2015 Hochmayr .......... F16H 61/6624 474/14
2016/0069435 A1* 3/2016 Ijichi ..................... F16H 57/028 474/45
2016/0131230 A1* 5/2016 Kawakami ............. F16H 55/56 474/28
2023/0160438 A1* 5/2023 Hamm .................. F16H 55/563 192/3.51
2023/0160463 A1* 5/2023 Wiegert .................... F16H 9/12 474/28

* cited by examiner

ASSISTED MECHANICAL CONTINUOUSLY VARIABLE TRANSMISSION

CROSS-REFERENCE TO RELATED APPLICATIONS

The present application claims the benefit of U.S. Provisional Patent Application Ser. No. 63/623,857, filed Jan. 23, 2024, the entire disclosure of which is incorporated by reference herein.

FIELD

The present disclosure relates generally to apparatuses, systems, and methods for modifying gear ratios in continuously variable transmissions. More specifically, the disclosure relates to apparatuses, systems, and methods for providing inputs for modifying the position of a moveable sheave of mechanical continuously variable transmissions.

BACKGROUND

Continuously variable transmissions ("CVT") are used in many vehicles. Mechanical CVTs are easier and cheaper to manufacture than alternative CVTs such as hydraulic and electronic CVTs. Rubber belt CVTs are also cheaper to manufacture than steel belt CVTs. However, one disadvantage of traditional, mechanical, rubber-belt CVTs is that once the CVT is installed, the CVT is tuned to specific settings and cannot be modified during vehicle operation.

SUMMARY

Provided herein are various embodiments of a CVT that include an actuator for modifying the CVT ratio of the CVT via input from the system or the user.

According to one example ("Example 1"), a continuously variable transmission includes a driven clutch; a drive clutch operably coupled to the driven clutch, the drive clutch including a stationary sheave, a moveable sheave positioned adjacent to the stationary sheave along a common axis of defined by a shaft and operable to translate axially relative to the stationary sheave, and a load member; a belt extending between the drive clutch and the driven clutch; and an actuator coupled to the moveable sheave of the drive clutch, the actuator operable to apply a force to the moveable sheave in a direction substantially along or parallel to the common axis.

According to another example ("Example 2"), further to Example 1, the actuator is one of a pneumatic actuator, hydraulic actuator, and an electromagnetic actuator.

According to another example ("Example 3"), further to Example 1, the actuator is coupled to the to the shaft.

According to another example ("Example 4"), further to Example 3, the CVT includes a spider nut, wherein the actuator includes a piston operably coupled to the spider nut and a cylinder coupled to the moveable sheave.

According to another example ("Example 5"), further to Example 4, a chamber is defined between the piston and the moveable sheave.

According to another example ("Example 6"), further to Example 5, the piston is fixedly positioned relative to the shaft and the cylinder is axially moveable relative to the shaft.

According to another example ("Example 7"), further to Example 6, the actuator includes a nozzle fluidly coupled to the chamber.

According to another example ("Example 8"), further to Example 7, the nozzle is coupled to the piston and wherein the piston and spider nut define a channel such that the nozzle is fluidly coupled to the chamber via the channel.

According to an example ("Example 9", a vehicle includes a frame and defining an operator area; a plurality of ground engaging members configured to support the frame; a powertrain assembly supported by the frame, the powertrain assembly including: an engine operably coupled to at least one of the plurality of ground engaging members; and a continuously variable transmission driven by the engine, the continuously variable transmission including: a driven clutch; a drive clutch operably coupled to the driven clutch, the drive clutch including a stationary sheave, a moveable sheave positioned adjacent to the stationary sheave along a common axis of defined by a shaft and operable to translate axially relative to the stationary sheave, and a load member; a belt extending between the drive clutch and the driven clutch; and an actuator coupled to the moveable sheave of the drive clutch, the actuator operable to apply a force to the moveable sheave in a direction substantially along or parallel to the common axis.

According to another example ("Example 10"), further to Example 9, the continuously variable transmission includes: a spider nut coupled to the shaft; a piston of the actuator coupled to the spider nut, wherein the piston is fixedly positioned relative to the shaft; a cylinder of the actuator coupled to the moveable sheave, wherein the cylinder is axially moveable relative to the shaft, and wherein a chamber is defined by the cylinder between the piston and the moveable sheave; and a nozzle of the actuator coupled to the piston and fluidly coupled to the chamber.

According to another example ("Example 11"), further to Example 10, the vehicle further includes a pressurized fluid source coupled to the actuator.

According to another example ("Example 12"), further to Example 11, the vehicle further includes a controller operably coupled to at least one of the pressurized fluid source and the actuator, the controller operable to result in actuation of the actuator based on predetermined conditions.

According to another example ("Example 13"), further to Example 12, the predetermined conditions include at least one of ground engaging member speed and throttle position.

According to another example ("Example 14"), further to Example 12, the controller includes at least first drive profile and a second drive profile, wherein the controller results in the actuator applying a first force to the moveable sheave based on a first predetermined condition when in the first drive profile and a second force to the moveable sheave based on the first predetermined condition when in the second drive profile, wherein the first force is different from the second force.

According to another example ("Example 15"), further to Example 12, the controller is configured to limit a rate of change in force applied to by the actuator based on at least one of ground engaging member speed and throttle position.

According to another example ("Example 16"), further to Example 11, the pressurized fluid source includes one of air and hydraulic oil.

According to another example ("Example 17"), further to Example 11, the vehicle further includes a fluid line coupling the pressurized fluid source and the actuator, wherein the actuator is positioned within the profile of the belt and the pressurized fluid source is positioned within or extends through a profile of the belt such that the belt is removable without removing the fluid line or the actuator.

According to another example ("Example 18"), further to Example 10, the at least one of the piston and spider nut define a channel such that the nozzle is fluidly coupled to the chamber via the channel when the drive clutch is shifted to engage the belt and wherein the channel is positioned to vent to atmosphere when the drive clutch is at a zero shift position.

According to another example ("Example 19"), further to Example 9, the continuously variable transmission includes: a spider nut coupled to the shaft; a piston of the actuator coupled to the spider nut, wherein the piston is fixedly positioned relative to the shaft; a cylinder of the actuator coupled to the moveable sheave, wherein the cylinder is axially moveable relative to the shaft, and wherein a chamber is defined between only the piston and cylinder; and a nozzle of the actuator coupled to the piston and fluidly coupled to the chamber.

According to another example ("Example 20"), further to Example 18, the actuator is a removeable cartridge such that the actuator and pressurized fluid source does not require bleeding when reinstalled.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
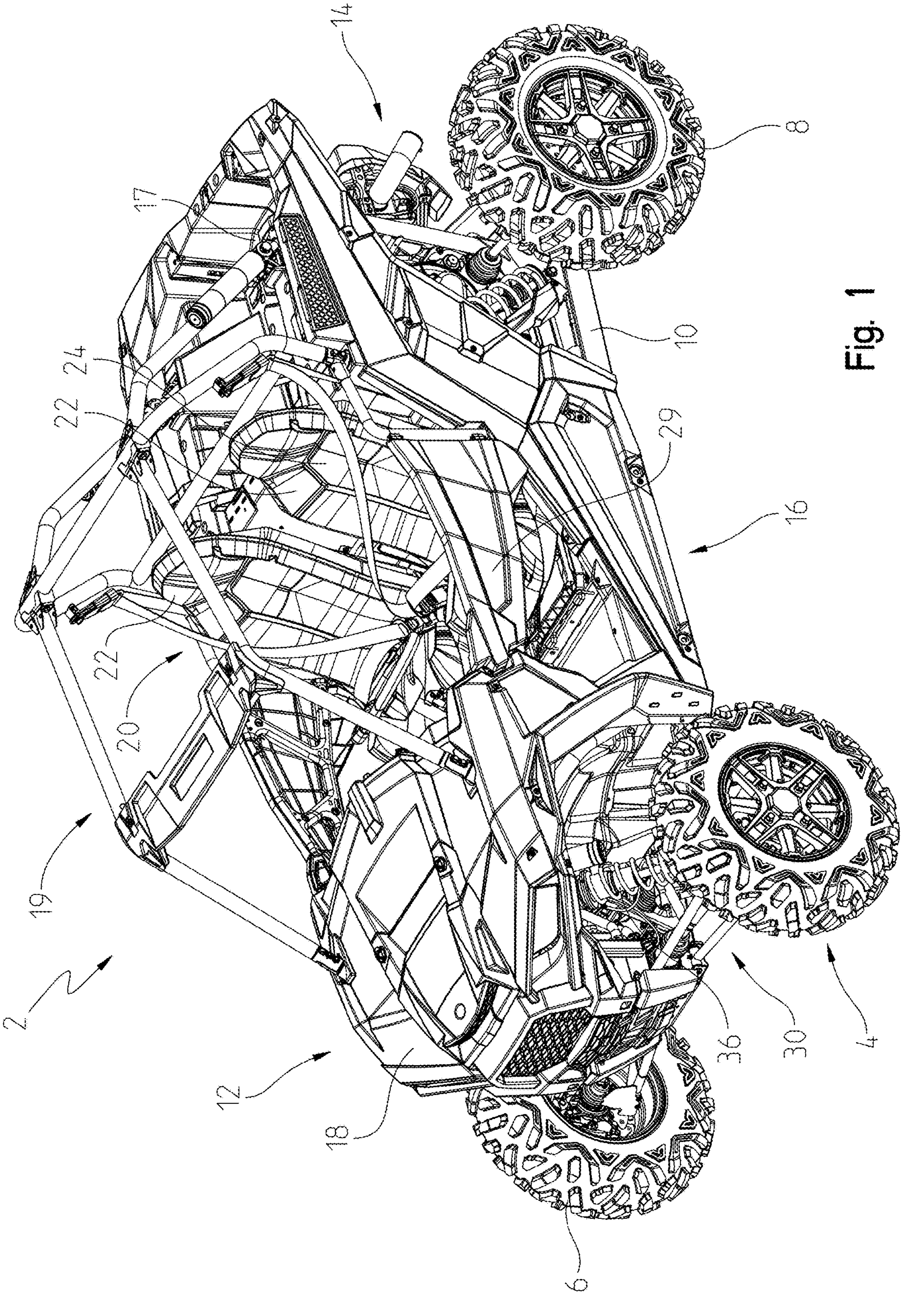
FIG. 1 is a front perspective view of a vehicle, in accordance with an embodiment.
Figure 2:
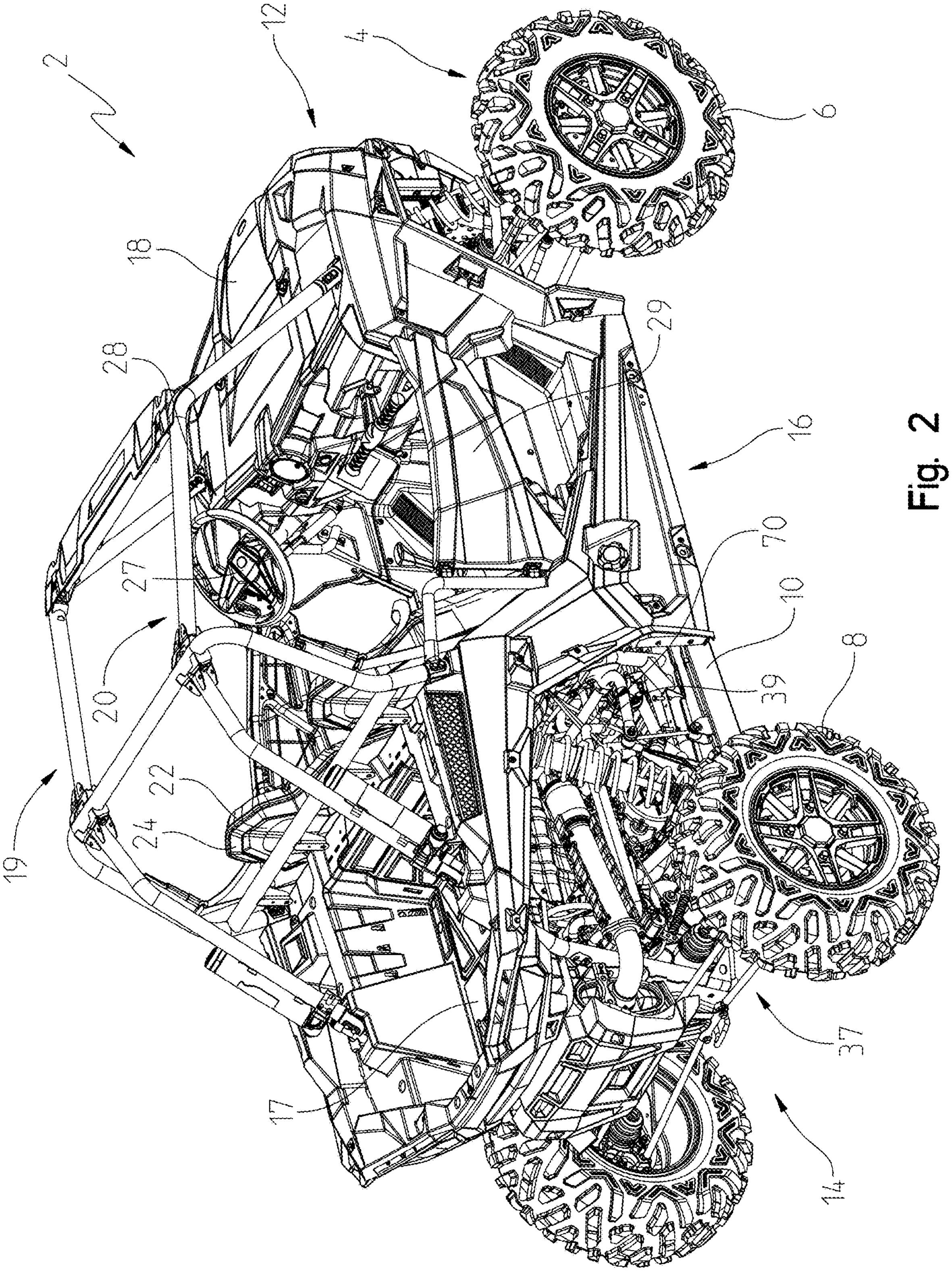
FIG. 2 is a rear perspective view of a vehicle, in accordance with an embodiment.
Figure 3:
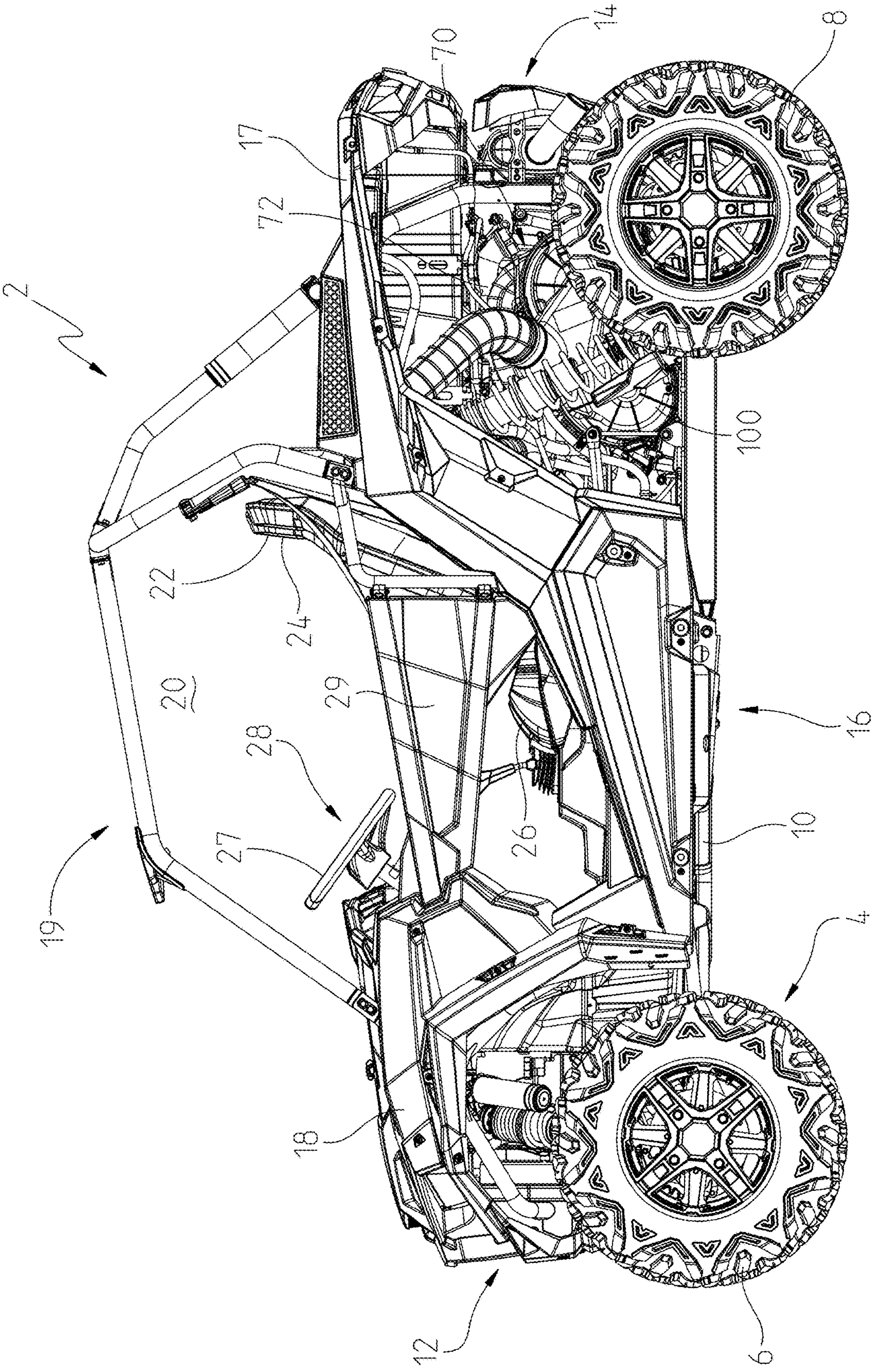
FIG. 3 is a left side view of a vehicle, in accordance with an embodiment.
Figure 4:
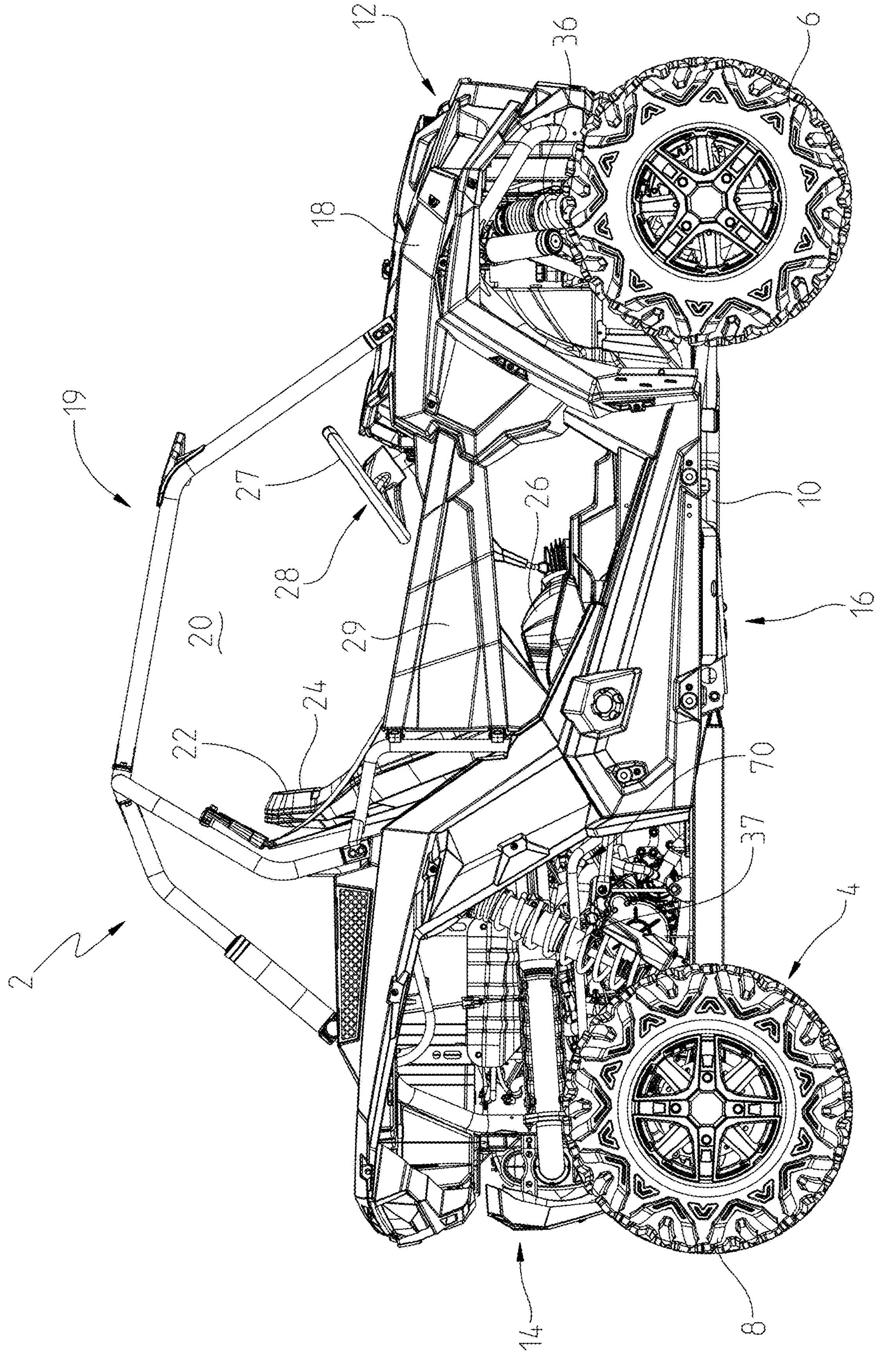
FIG. 4 is a right side view of a vehicle, in accordance with an embodiment.
Figure 5:
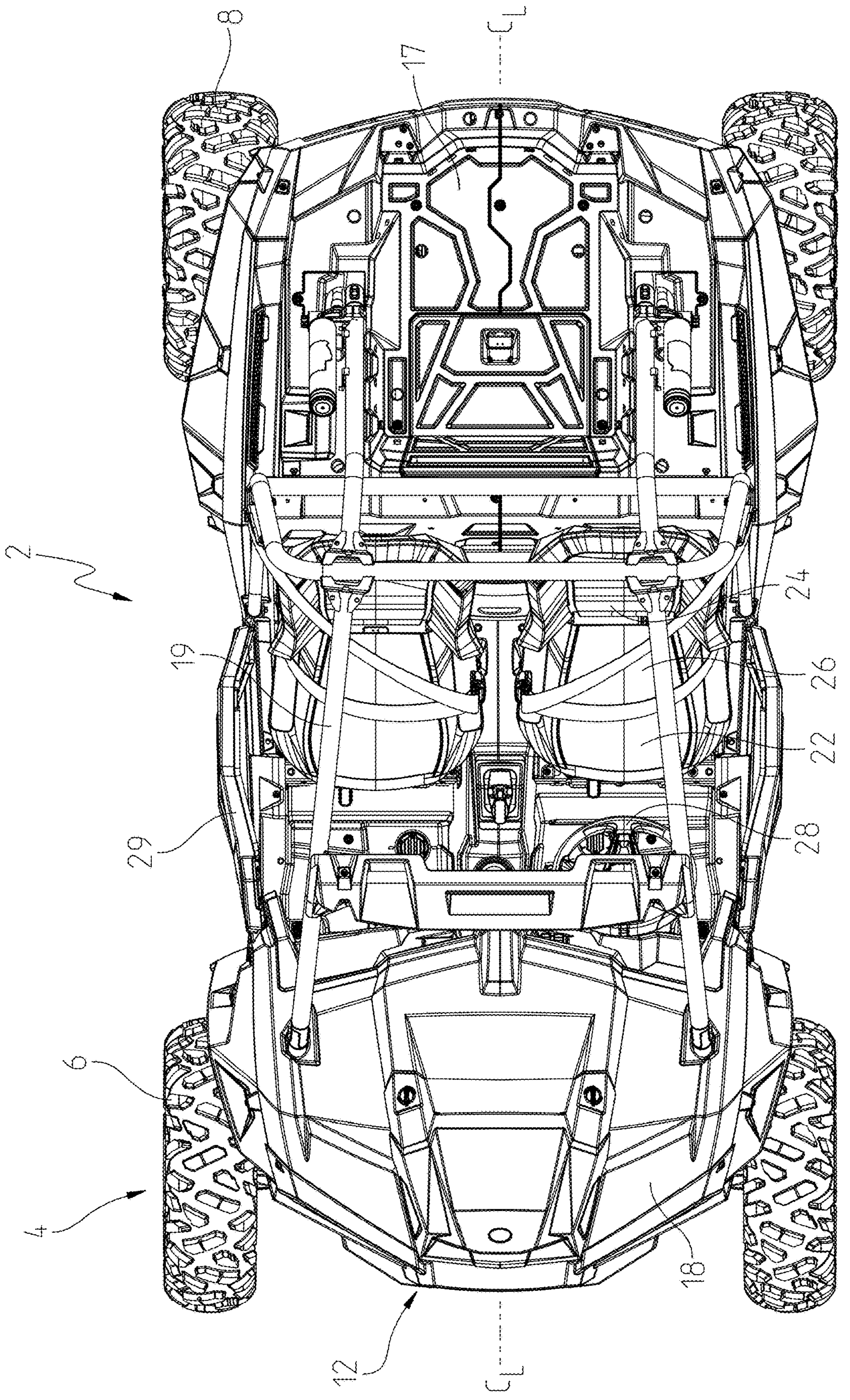
FIG. 5 is a top view of a vehicle, in accordance with an embodiment.
Figure 6:
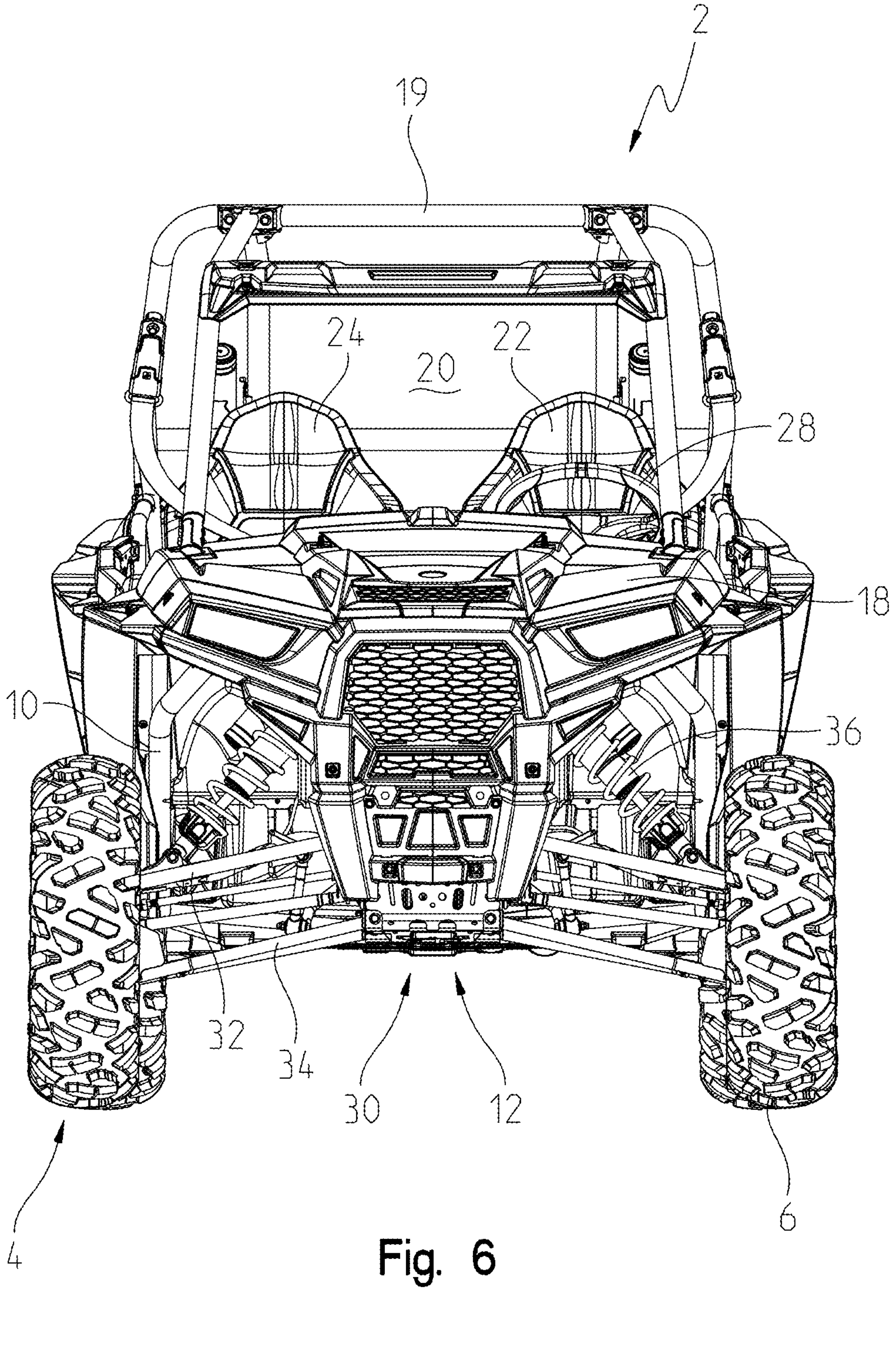
FIG. 6 is a front view of a vehicle, in accordance with an embodiment.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference. It is understood that the embodiments discussed herein could be implemented with respect to any number of vehicles including snow vehicles such as snowmobiles, motorcycles, side-by-sides, all-terrain vehicles, and so forth.

Vehicle 2 further includes a lower frame assembly 10 supported by ground-engaging members 4, which extends along a longitudinal centerline CL of vehicle 2. Lower frame assembly 10 includes a front portion 12, a rear portion 14, and an intermediate portion 16 extending therebetween. Additionally, vehicle 2 includes an upper frame assembly 19 extending vertically above lower frame assembly 10 and, more particularly, above at least intermediate portion 16 of lower frame assembly 10. Lower frame assembly 10 supports a rear cargo support area 17 and a vehicle body 18, which includes a plurality of body panels.

Vehicle 2 also includes an operator area 20 which includes seating 22 for one or more passengers. Upper frame assembly 19 may be positioned generally around operator area 20 such that seating 22 is at least partially surrounded by upper frame assembly 19. Additionally, side nets or doors 29 may be positioned along the sides of operator area 20 and seating 22. Illustratively, seating 22 includes an operator seat and a passenger seat, however, seating 22 may also include rear seats for additional passengers. Seating 22 may include a seat back 24 and a seat bottom 26 for at least the operator and a passenger.

Operator area 20 further includes a plurality of operator controls 28, such as a steering wheel 27, by which an operator may provide input for operating vehicle 2. Additionally, the steering assembly, which includes steering wheel 27, may be configured for a 1.5 turn for lock to lock. Various operator controls, including the steering assembly, are further described in International Patent Application No. PCT/US13/64516, filed on Oct. 11, 2013, the complete disclosure of which is expressly incorporated by reference herein. Operator area 20 and controls 28 may further include an HVAC system for the comfort of the operator and the passengers.

Figure 7:
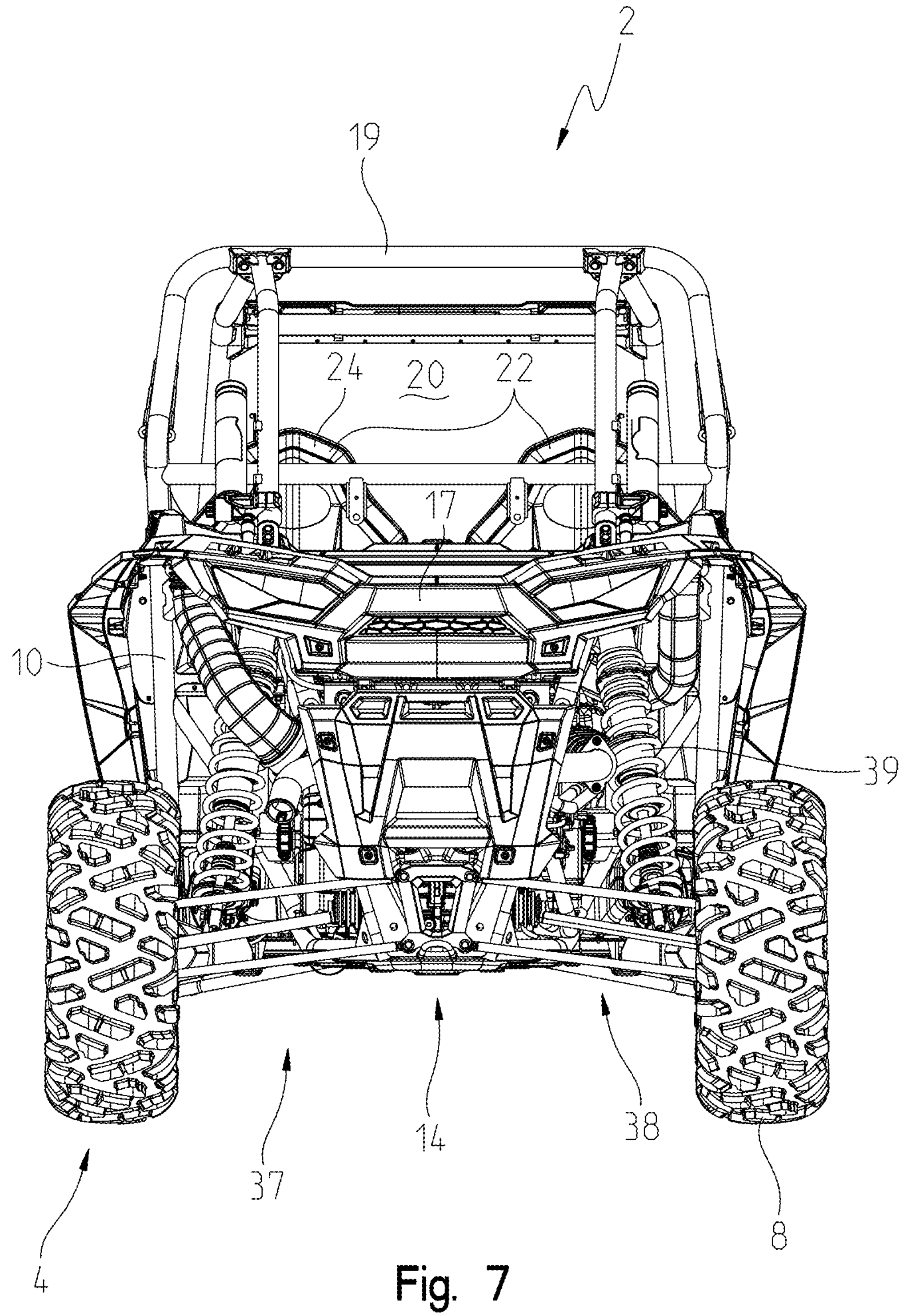
FIG. 7 is a rear view of a vehicle, in accordance with an embodiment.

Referring to FIG. 7, vehicle 2 includes a rear suspension assembly 37, as shown in FIG. 7, which includes shock absorbers 39. In one embodiment, shock absorbers 39 may be internal bypass shocks, as disclosed in International Patent Application No. PCT/US13/64516, filed on Oct. 11, 2013, the complete disclosure of which is expressly incorporated by reference herein.

Vehicle 2 further includes a powertrain assembly 70 which is supported by rear portion 14 of lower frame assembly 10 and includes an engine 72, a shiftable transmission 74, and a continuously variable transmission ("CVT") 100. In some embodiments, powertrain assembly 70 may further include a forced-air inducer, for example, a gaseous charger (not shown). In one embodiment, the gaseous charger may be a turbocharger, however, alternatively, the gaseous charger may be a supercharger or any other similar device.

Figure 8:
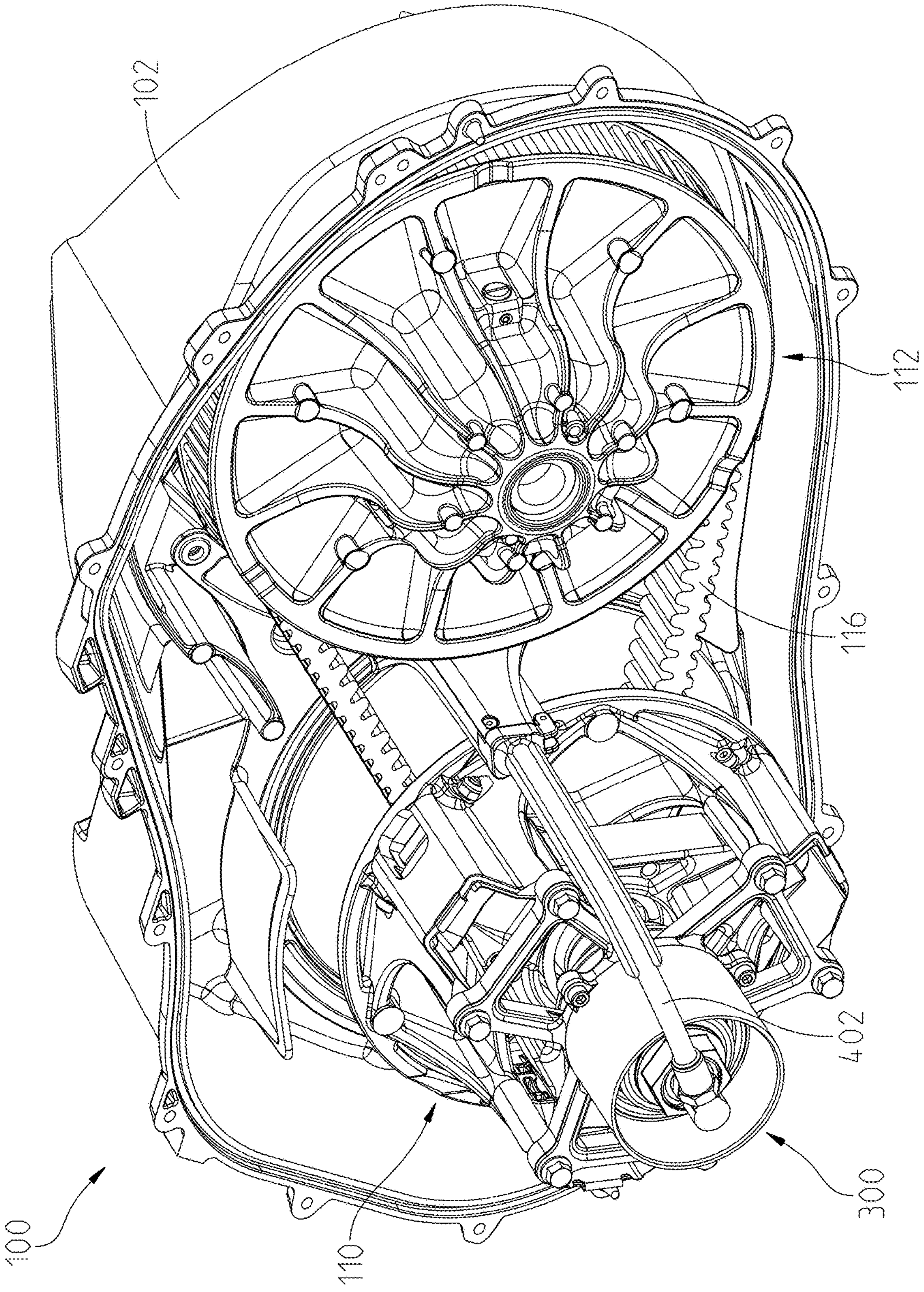
FIG. 8 is a perspective view of a CVT with an actuator, in accordance with an embodiment.
Figure 9:
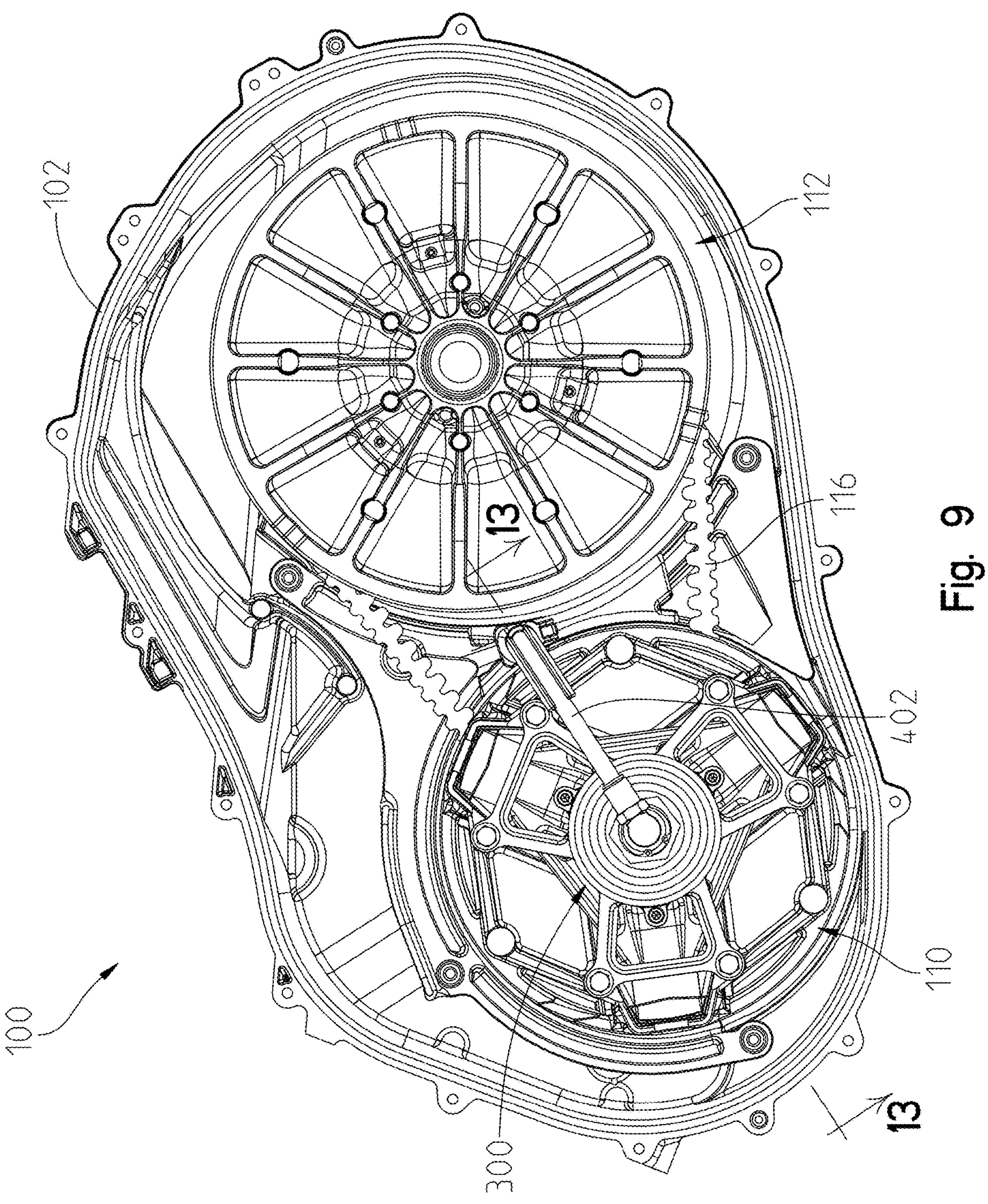
FIG. 9 is a side view of a CVT with an actuator, in accordance with an embodiment.
Figure 10:
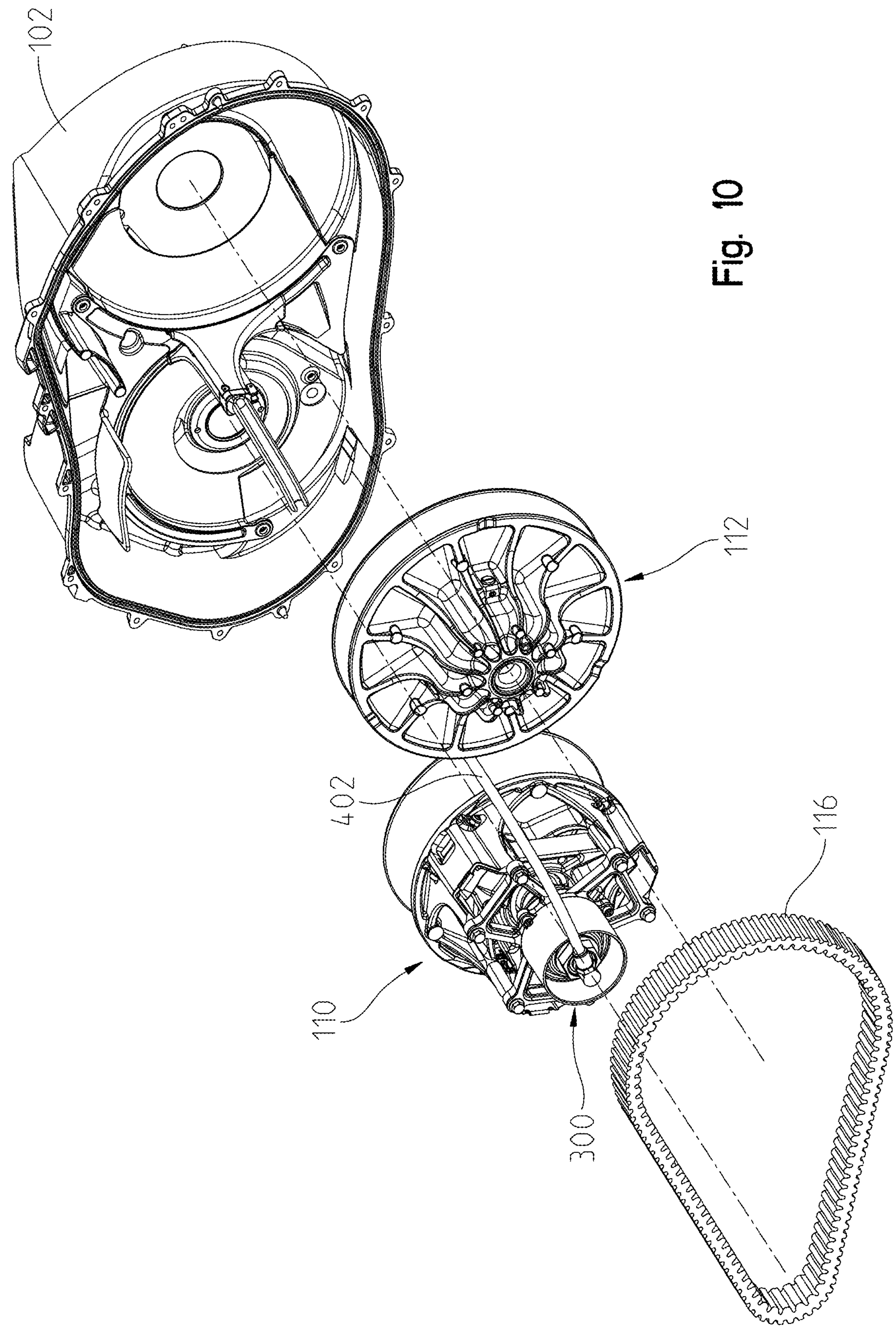
FIG. 10 is an exploded view of a CVT with an actuator, in accordance with an embodiment.

Referring to FIGS. 8-10, CVT 100 is illustrated. CVT 100 includes an inner cover 102 and an outer cover (not shown). CVT 100 includes a primary or drive clutch or pulley 110, a secondary or driven clutch or pulley 112, and a belt 116 extending therebetween, which are positioned within inner 102 and outer covers. Drive clutch 110 is rotatably coupled to crankshaft (not shown) of engine 72. Driven clutch 112 is rotatably coupled to an input shaft 118 of shiftable transmission 74 and is rotatably coupled to drive clutch 110 through belt 116. Belt 116 may be comprised of a polymeric material, for example rubber, and may also include reinforcing members, such as metal cords or other reinforcing material. In one embodiment, belt 116 may be comprised of a metallic material, for example, belt 116 may be a chain. In cross-section, belt 116 may generally define a "V" shape. Belt 116 is configured to contact drive clutch 110 and expand in diameter in order to contact driven clutch 112.

As shown in FIGS. 8-11, drive clutch 110 includes a moveable sheave 120 positioned adjacent outer cover (not shown) of CVT 100 and a stationary sheave 122 positioned adjacent inner cover 102 of CVT 100. Stationary sheave 122 includes a center opening 124 for engaging with a first splined portion 126 of a post 123 which includes a tapered volume 125 for engaging crankshaft 84 of engine 72. It is understood that other non-splined embodiments are likewise applicable including cast-on sheaves. Post 123 further includes a second splined portion 128 for engaging with splined portion 152 of spider 132. During operation of CVT 100, stationary sheave 122 maintains a fixed position and does not move relative to post 123.

Conversely, moveable sheave 120 of drive clutch 110 is configured for lateral movement relative to stationary sheave

122 in order to engage belt 116 and effect various drive ratios. Washers 148 and a bearing 150 are positioned intermediate stationary sheave 122 and moveable sheave 120 to define a belt groove or path for belt 116. Washers 148 and bearing 150 are not positioned within center opening 124 of stationary sheave 122 because the diameter of center opening 124 is less than the diameter of washers 148 and the diameter of bearing 150.

Moveable sheave 120 includes a tower or base member 130, an intermediate member, load member, or spider member 132 positioned adjacent tower member 130, and a cover member 134 positioned adjacent spider member 132, such that spider member 132 is intermediate tower member 130 and cover member 134. Cover member 134 is coupled to tower member 130 with fasteners 144 to tower member 130. Cover member 134 includes a center opening 154.

Moveable sheave 120 also includes a plurality of weights, illustratively flyweights 136, which are rotatably coupled to tower member 130 with pins 138 and fasteners 140. Flyweights 136 are centrifugal weights which may pivot radially to cause moveable sheave 120 to move or slide laterally relative to stationary sheave 122. Various embodiments of tower member 130 and flyweights 136 are within the scope of the disclosure provided herein.

Figure 11:
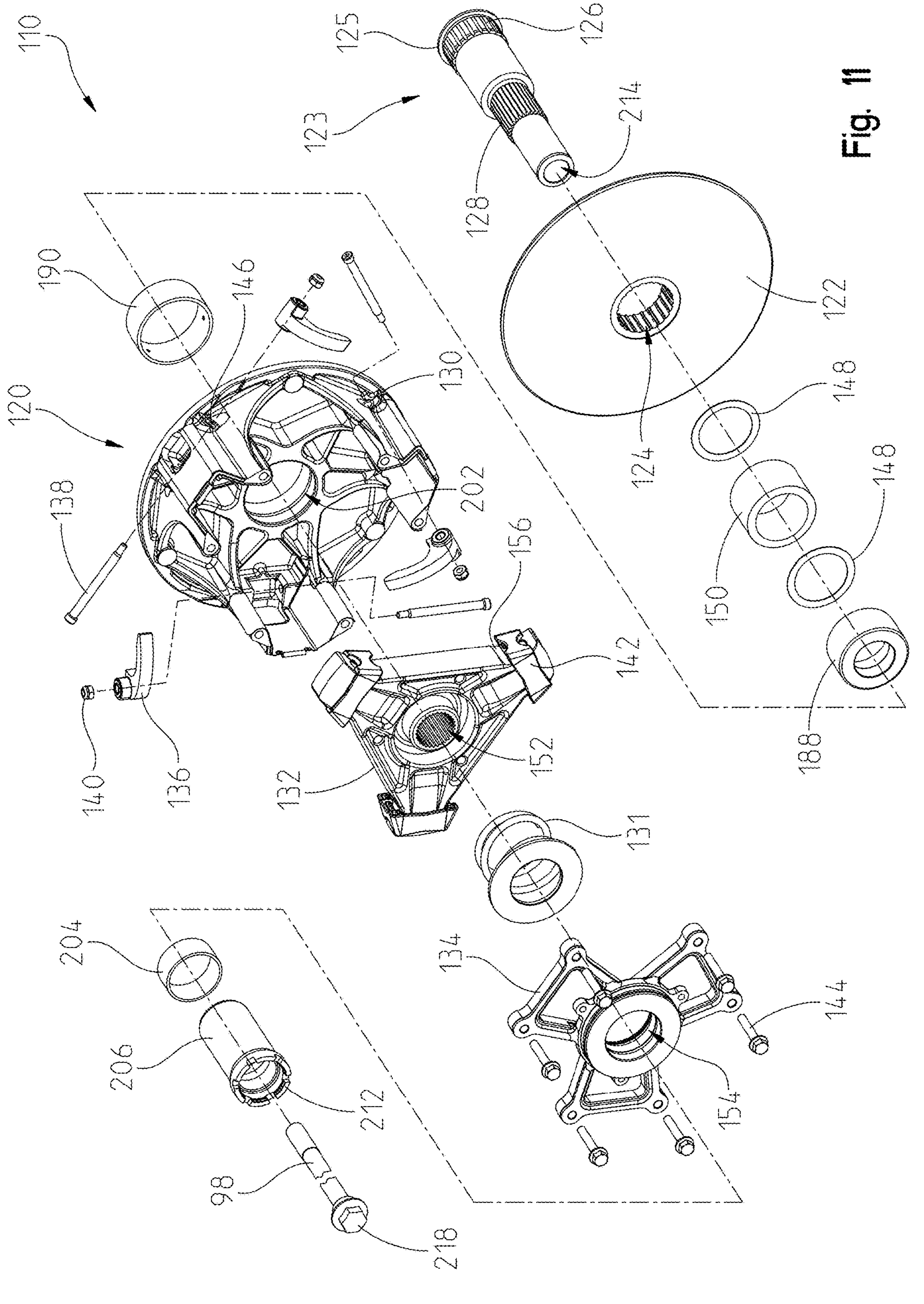
FIG. 11 is an exploded view of a drive clutch of a CVT, in accordance with an embodiment.
Figure 12:
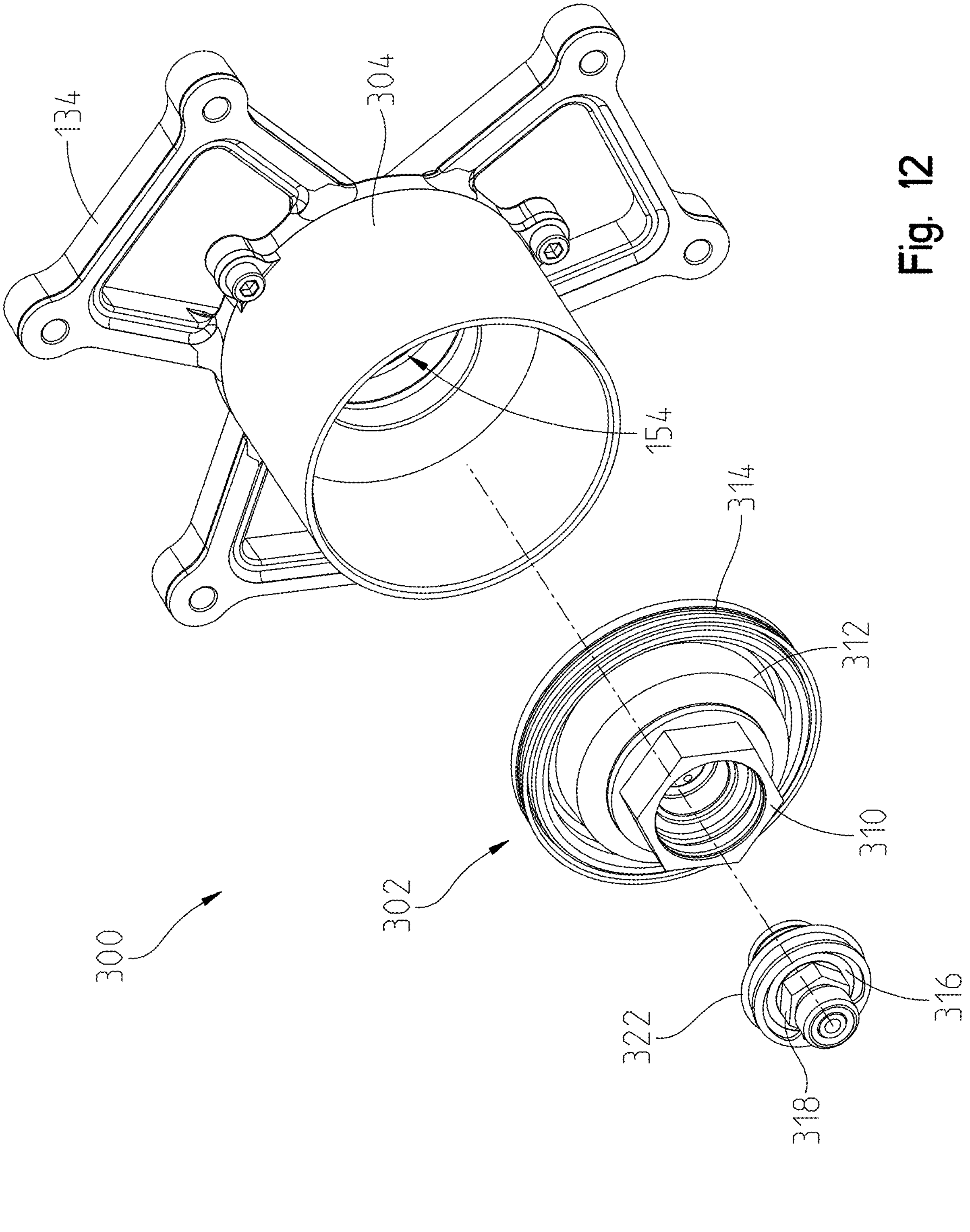
FIG. 12 is an exploded view of an actuator for a CVT, in accordance with an embodiment.
Figure 13:
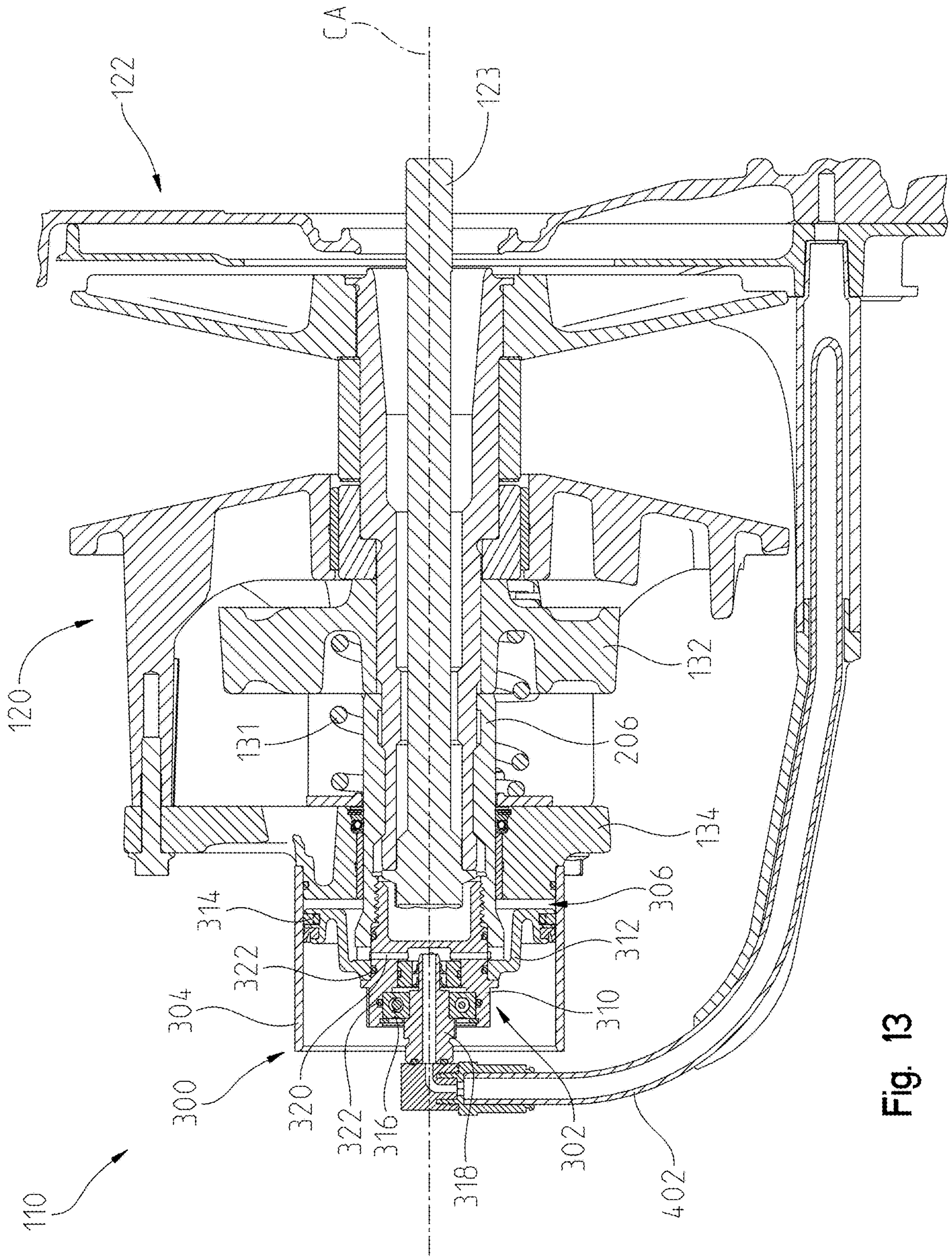
FIG. 13 is a section view of an actuator and a drive clutch of a CVT, in accordance with an embodiment.

As shown in FIG. 11, spider member 132 includes a splined center opening 152, a plurality of corners or posts 156, and a plurality of locating or position members 142. Because of splined center opening 152 which engages post 123 which is coupled to crankshaft, spider member 132 is configured to transfer torque from crankshaft to moveable sheave 120. Illustratively, spider member 132 has a generally triangular shape defining three posts 156 and each position member 142 is coupled to one of posts 156 of spider member 132. As with stationary sheave 122, moveable sheave 120 also engages post 123. More particularly, splined center opening 152 of spider member 132 engages second splined portion 128 of post 123.

Figure 14:
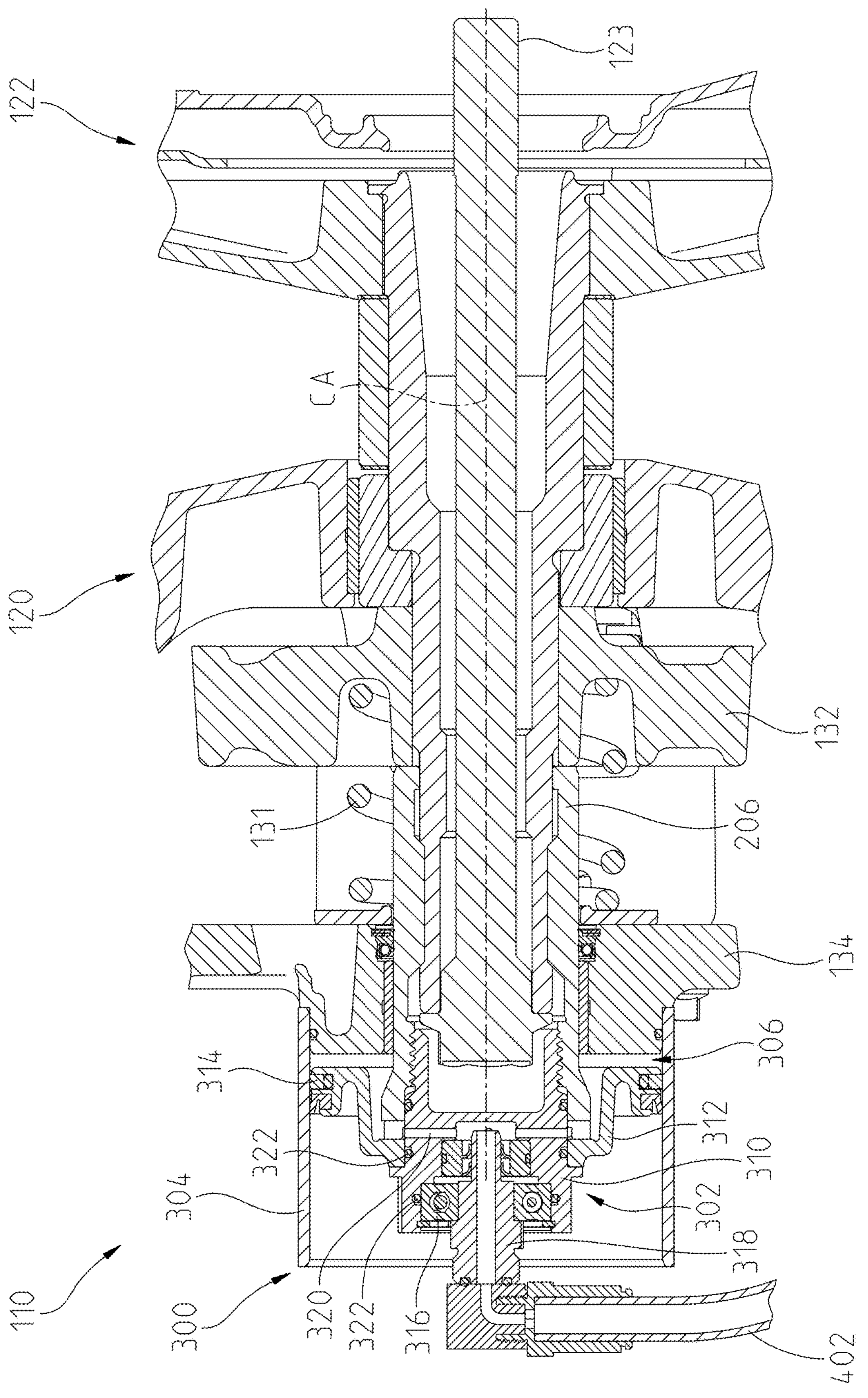
FIG. 14 is a section view of an actuator and a drive clutch of a CVT in a zero-shift position, in accordance with an embodiment.
Figure 15:
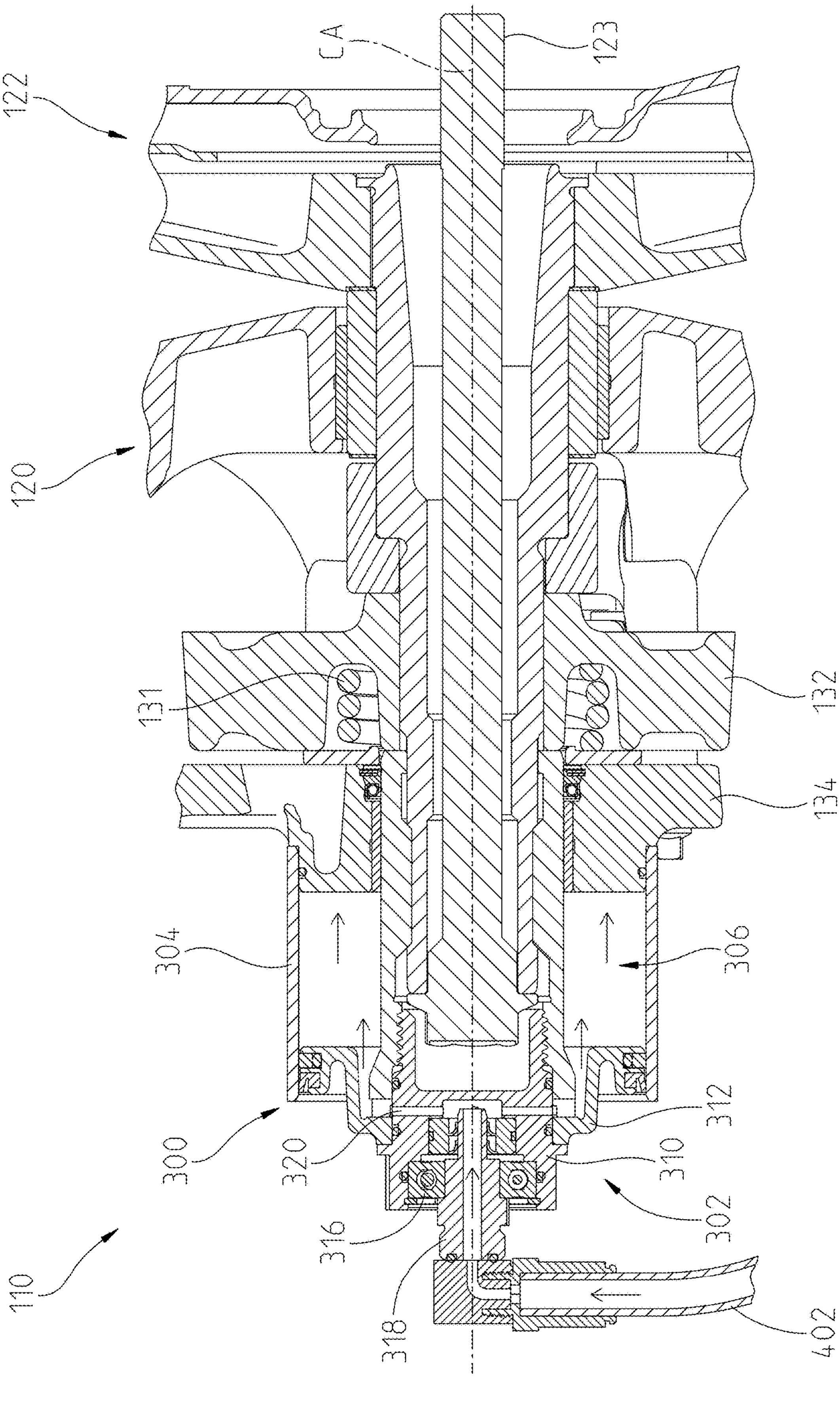
FIG. 15 is a section view of an actuator and a drive clutch of a CVT when the actuator is activated and is applying pressure to modify the CVT ratio, in accordance with an embodiment.
Figure 16:
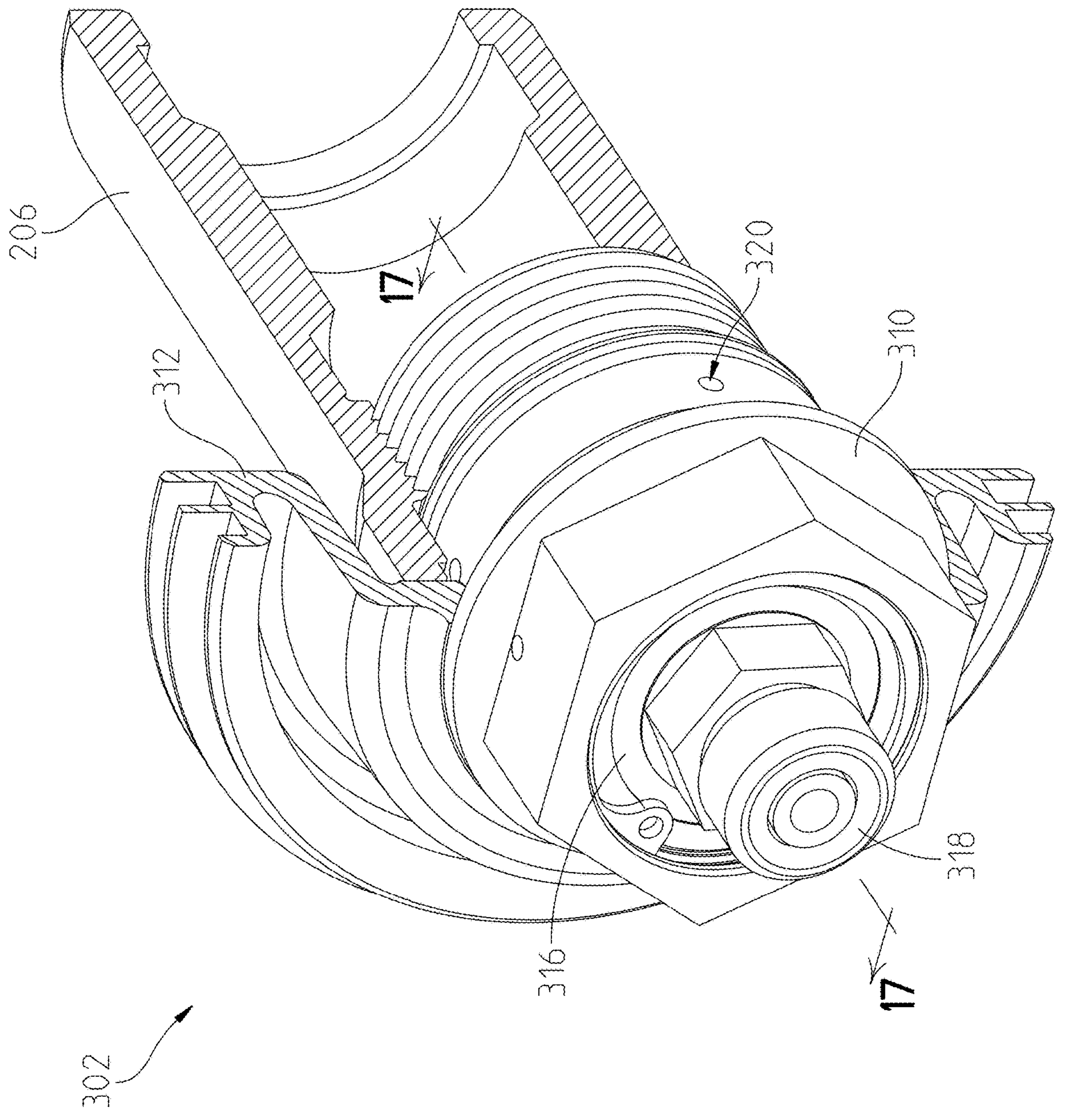
FIG. 16 is a perspective and partial section view of a cylinder, spider nut, and nozzle, in accordance with an embodiment.
Figure 17:
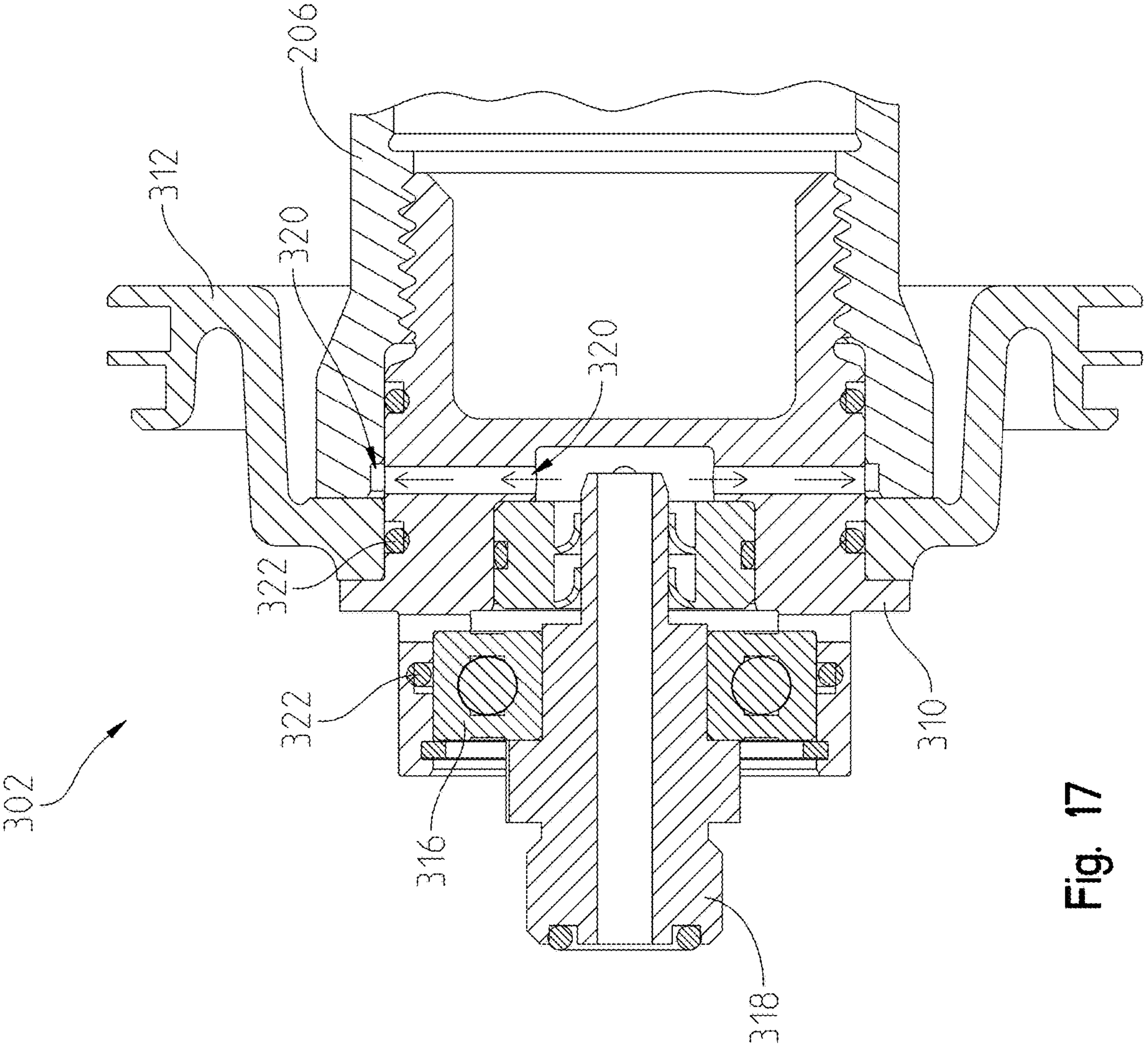
FIG. 17 is a section view of a nozzle for introducing a fluid into the actuator, in accordance with an embodiment.
Figure 18:
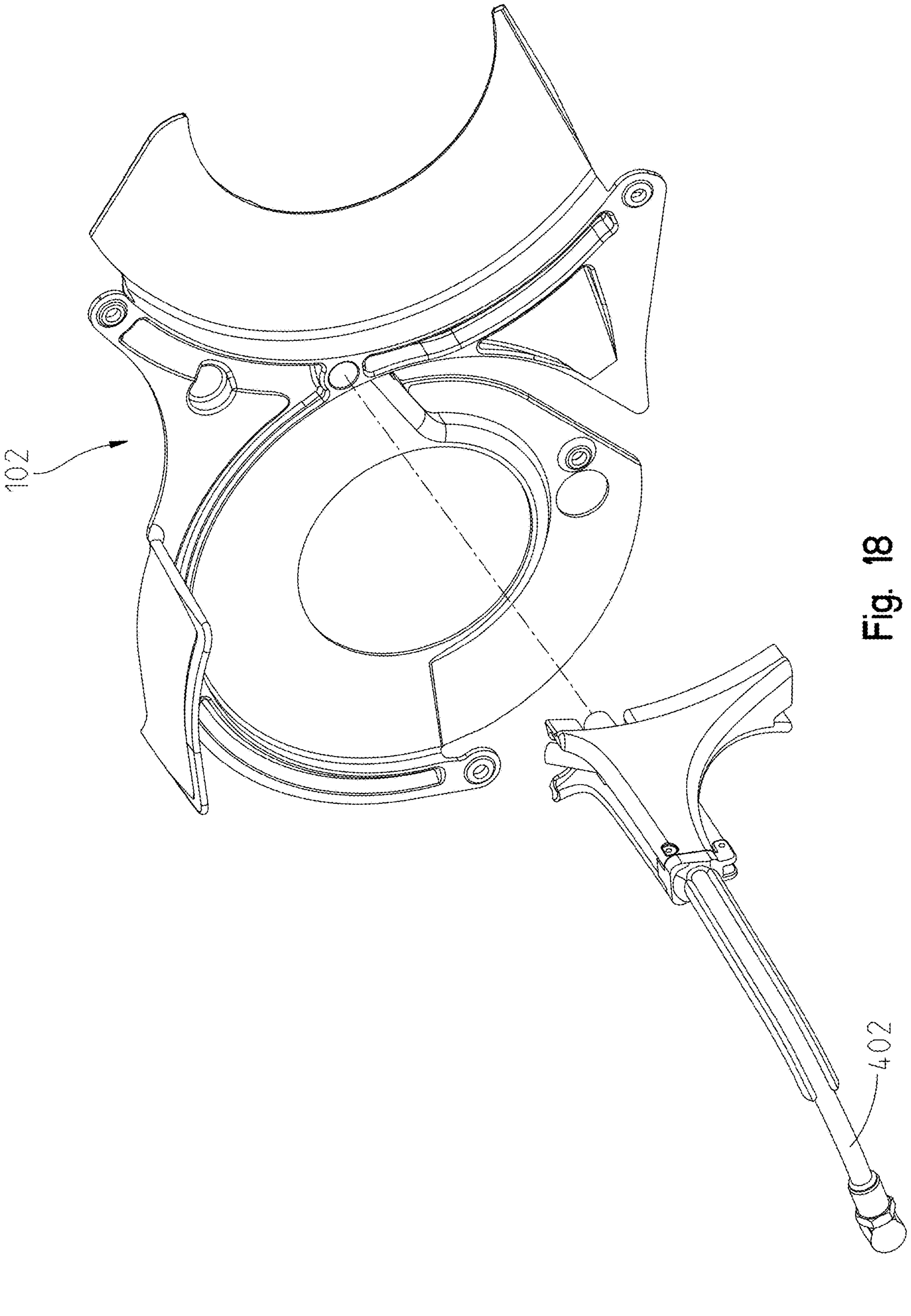
FIG. 18 is a perspective view of a fluid line in relation to a cover for a CVT, in accordance with an embodiment.

During operation of CVT 100, drive clutch 110 rotates with crankshaft through post 123 because a distal end of crankshaft is received within tapered volume 125 of post 123. At various operating conditions of vehicle 2, drive clutch 110 rotates at a speed which causes flyweights 136 to pivot about pin 138. The centrifugal force on flyweights 136 causes flyweights 136 to pivot or rotate radially against bearing of spider member 132. This movement of flyweights 136 applies a force to moveable sheave 120 to cause moveable sheave 120 to slide or translate laterally along sleeve member 206 and bearing 150 relative to stationary sheave 122. In this way, the radial position of belt 116 on moveable sheave 120 and stationary sheave 122 may be adjusted to accommodate various operating conditions of vehicle 2, thereby resulting in various drive ratios. During operation, drive clutch 110 is configured to move between an open position, as shown in FIG. 14, and a closed position in which moveable sheave 120 and stationary sheave 122 are proximate each other and further movement of moveable sheave 120 toward stationary sheave 122 is no longer possible. Movement of moveable sheave 120 may be controlled electronically, mechanically, or fluidly. The rotation of belt 116 caused by drive clutch 110 drives driven clutch 112.

Turning to a discussion of FIGS. 12-17, CVT 100 includes an actuator 300 which allows for CVT 100 (i.e., a mechanical CVT) to be assisted for adapting various CVT ratios (e.g., gear ratios) beyond the various mechanical systems providing the tuned gear ratios inherent in the system. As discussed, CVT 100 includes drive clutch 110 and driven clutch 112 operably coupled. Drive clutch 110 includes stationary sheave 122 and a moveable sheave 120 positioned adjacent to stationary sheave 122 along a common axis CA defined by shaft or post 123. Moveable sheave 120 is operable to translate axially relative to the stationary sheave 122. Drive clutch 110 further includes load member or spider 132. CVT 100 includes rubber belt 116 extending between drive clutch 110 and driven clutch 112. Actuator 300 is coupled to moveable sheave 120 of drive clutch 110. Actuator 300 is operable to apply a force to moveable sheave 120 in a direction substantially along or parallel to the common axis CA. By applying the force, actuator 300 is able to modify the CVT ratio beyond the typical mechanical systems previously described. This allows system or user control of the CVT ratio based on control of actuator 300 in addition to the existing components (e.g., spring 131 and shift weight 136) that adjust the CVT ratio based on the physical conditions such as speed. Actuator 300 may be provided to manipulate the effects of CVT 100 while maintaining typical rubber belt CVT components and calibration (e.g., belt engagement). In some embodiments, actuator 300 may be tuned to provide additional effects beyond minor inputs (e.g., by assisting or causing belt engagement). In some embodiments, various actuators may be implemented, including but not limited to pneumatic, hydraulic, and electromagnetic actuators.

According to some embodiments, a portion of actuator 300 is coupled to sleeve member 206 (e.g., spider nut), where sleeve member 206 is coupled to post 123. Because moveable sheave 120 is able to move relative to sleeve member 206, and because actuator 300 is coupled to sleeve member 206 and contacts moveable sheave 120 to apply the force, in some embodiments, sleeve member 206 and associated supporting components provide the anchor point for actuator 300 and facilitate actuator support for applying pressure to moveable sheave 120. The length of sleeve member 206 is such that sleeve member 206 extends beyond moveable sheave 120 to provide the mounting position for actuator 300. In some embodiments, sleeve member 206 includes internal threading configured to receive threading of actuator 300.

According to some embodiments, actuator 300 comprises a piston 302 operably coupled to sleeve member 206 and a cylinder 304 coupled to moveable sheave 120. Piston 302 is fixedly coupled to sleeve member 206 such that when moveable sheave 120 moves relative to sleeve member 206, moveable sheave 120 also moves relative to piston 302. Cylinder 304 is fixedly coupled to moveable sheave 120 such that cylinder 304 moves relative to both piston 302 and sleeve member 206. A chamber 306 is defined by cylinder 304 and, in at least some embodiments, is defined between piston 302 and moveable sheave 120 (e.g., cover member 134). By having a stationary piston and movable cylinder, packaging of actuator 300 is decreased.

Piston 302 may define various components of actuator 300. For example, in some embodiments, piston 302 defines coupling portion 310 with threads as previously discussed, coupling portion 310 configured to couple to internal threads of sleeve member 206. Piston 302 further includes head or crown 312. Crown 312 includes seals or gaskets 314 for sealing with cylinder 304. Crown 312 also provides surface defining at least a portion of chamber 306. Crown 312 can extend from (either as an integral portion or coupled to) coupling portion 310. Piston 302 further includes a rotary union housing 316 for receiving a rotary union 318. Rotary union housing 316 and rotary union 318 (e.g., nozzle) facilitate coupling of parts that rotate (e.g., drive clutch 110)

and those that do not (e.g., air lines for delivering pressurized air to chamber 306). Rotary union 318 is stationary and supports an air line with a ball bearing and can seal against the rotary union housing 316. O-rings and snap rings may seal and fix components to each other. Rotary union or nozzle 318 is fluidly coupled to chamber 306.

Pressurized air is delivered from a pressurized air source, through rotary union 318, through piston 302, through sleeve member 206, and into chamber 306. Channels 320 are defined in piston 302 and sleeve member 206. For example, rotary union 318 is positioned with rotary union housing 316 such that it is in fluid communication with channels 320. Channels 320, in some embodiments, extends through coupling portion 310 toward sleeve member 206. Channels 320 may extend radially outward perpendicular to common axis CA (see FIG. 13) or may extend outward at an angle relative to common axis CA when viewed from the side (see FIG. 19). In some embodiments, sleeve member 206 includes castle nut end and is provided with channels 320. The castle nut end and sleeve member 206 are provided to clamp spider member 132. For example, channels 320 may be machined to include a relief to allow air to flow.

Sleeve member 206 extends from the moveable sheave 120 but is as short as possible to limit leverage on crankshaft of engine. In some embodiments, piston 302 and cylinder 304 are a single acting cylinder, and in other embodiments cylinder 304 is double acting. In some embodiments discussed hereafter, a pathway may also be formed to vent to atmosphere when moveable sheave 120 is in certain positions. In some embodiments, the pathway may be blocked to selectively limit venting to atmosphere, Seals 322 may be positioned throughout the system to limit air flow and maintain pressure along the channels 320 and chamber 306. For example, seal 322 is positioned between coupling portion 310 and sleeve member 206. In embodiments where crown is coupled to rotary union housing 316 and/or coupling portion 310, seal 322 may be positioned therebetween. Seal 322 is positioned between moveable sheave 120 and cylinder 304.

With further reference to chamber 306, as previously included, chamber 306 may be defined between various components. For example, chamber 306 may be defined by moveable sheave 120, cylinder 304, piston 302, and sleeve member 206. Other components may also or alternatively define part of chamber 306 in some embodiments. Piston 302 is formed such that no part of moveable sheave 120 or cylinder may be positioned underneath or between the piston 302 and the sleeve member 206, even in a fully open position (e.g., zero shift).

During operation, pressurized fluid source 400 may provide pressurized fluids (e.g., pressurized gasses or liquids) to chamber 306. As pressurized fluids are introduced to chamber 306, forces are exerted on the components defining chamber 306. As actuator 300 includes piston 302 that is stationary (e.g., with sleeve member 206) and cylinder 304 that is moveable (e.g., with moveable sheave 120), when sufficient pressure is introduced to result in a force sufficient to actuate the system, cylinder 304 and moveable sheave 120 are moved. The pressure and force exerted may be tuned for specific functions such as limiting or slowing movement of moveable sheave 120 outward during acceleration or actively moving moveable sheave 120 inward. Thus, in operation, actuator 300 works in tandem or to tune the typical systems in CVT 100 which may be calibrated for discrete CVT ratios (e.g., spring, weights, etc.).

Figure 19:
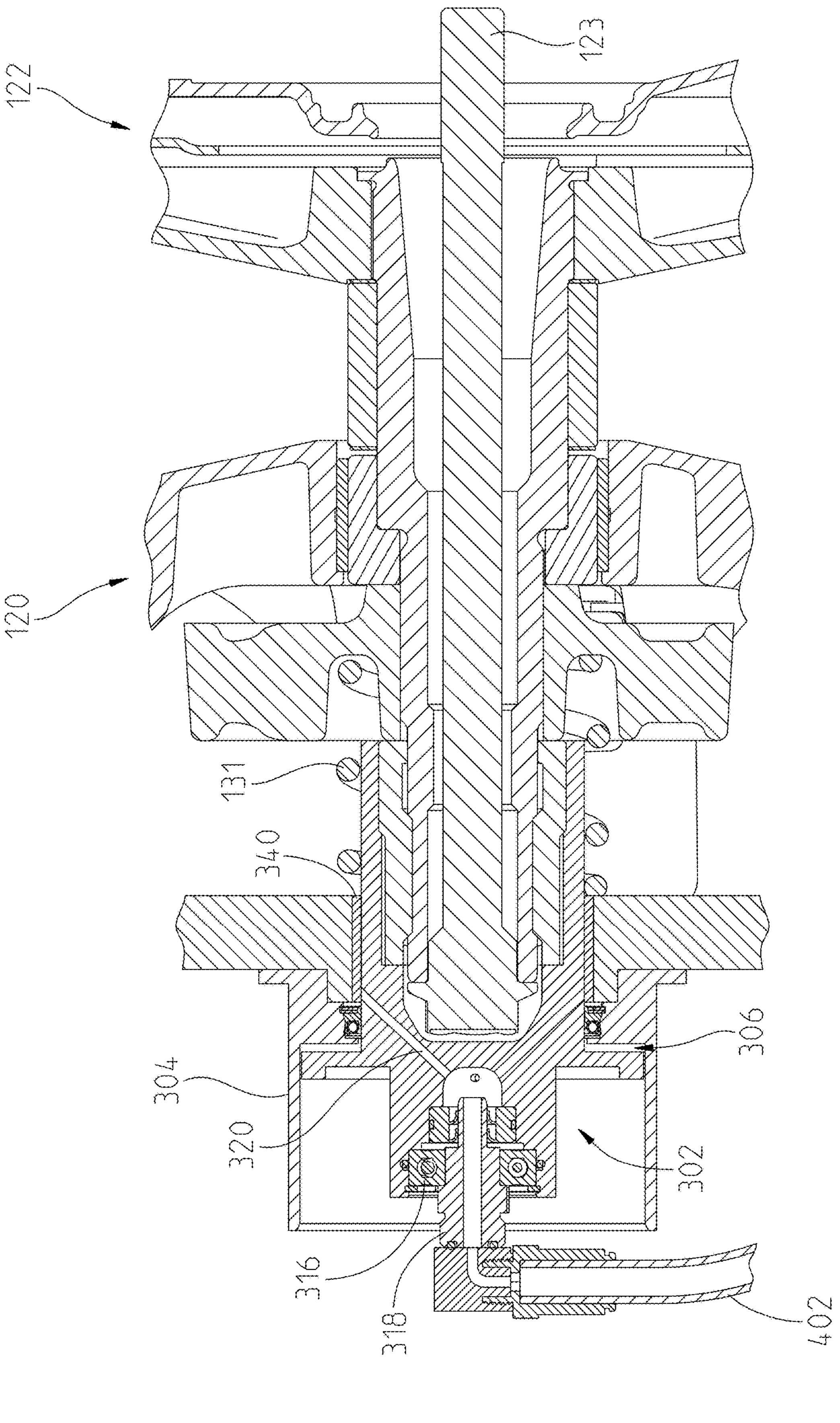
FIG. 19 is a section view of an alternative arrangement of an actuator configured to vent to atmosphere in zero shift, in accordance with an embodiment.

Referring to FIG. 19, in some embodiments, channel 320 is shown such that it is not in fluid communication with chamber 306 in the zero-shift position. In this way, unintended application of fluid pressure will not result in engagement of the CVT. Fluid would instead travel through channel 320 and lead to atmosphere by flowing through components such as moveable sheave bushing 340, which are not air tight. When the driver applies throttle, shift weights will engage the belt and move moveable sheave inward, which results in channel 320 being positioned in fluid communication with chamber 306. In some embodiments, tolerances around moveable sheave bushing 340 may act as a passive bleed port to allow pressurized fluid to escape when drive clutch 110 is in the zero shift position. This limits the ability of actuator 300 from shifting drive clutch from the zero shift position (see FIG. 14) to an engaged position (see FIG. 15). This can help reducer undesired engagement of CVT 100 outside of the calibrated settings (e.g., spring, weights, etc.) of CVT 100. Passive bleed port 340 is configured such that when drive clutch 110 is in the zero shift position, channel 320 is fluidly coupled to passive bleed port 340 and is not fluidly coupled to chamber 306 (see FIG. 19). Seal 322 is positioned such seal is between passive bleed port 340 and chamber 306. Thus, when drive clutch 110 is in the zero shift position, channel 320 is fluidically separated from chamber 306 by seal 322 and is in fluid communication with passive bleed port 340 and when drive clutch is shifted to engage rubber belt 116, channel 320 is separated from passive bleed port 340 and is in fluid communication with chamber 306. In these embodiments, pressurized air may be implemented such that air from actuator 300 is vented to atmosphere if actuator 300 is engaged when drive clutch 110 is in zero shift position.

In those embodiments where no bleed port is provided, actuator 300 may be implemented to help transition drive clutch 110 out from zero shift and to engage rubber belt 116. Such embodiments are shown in at least FIGS. 14-17. In this embodiment, pressurized air or pressurized liquids may be implemented.

Figure 20:
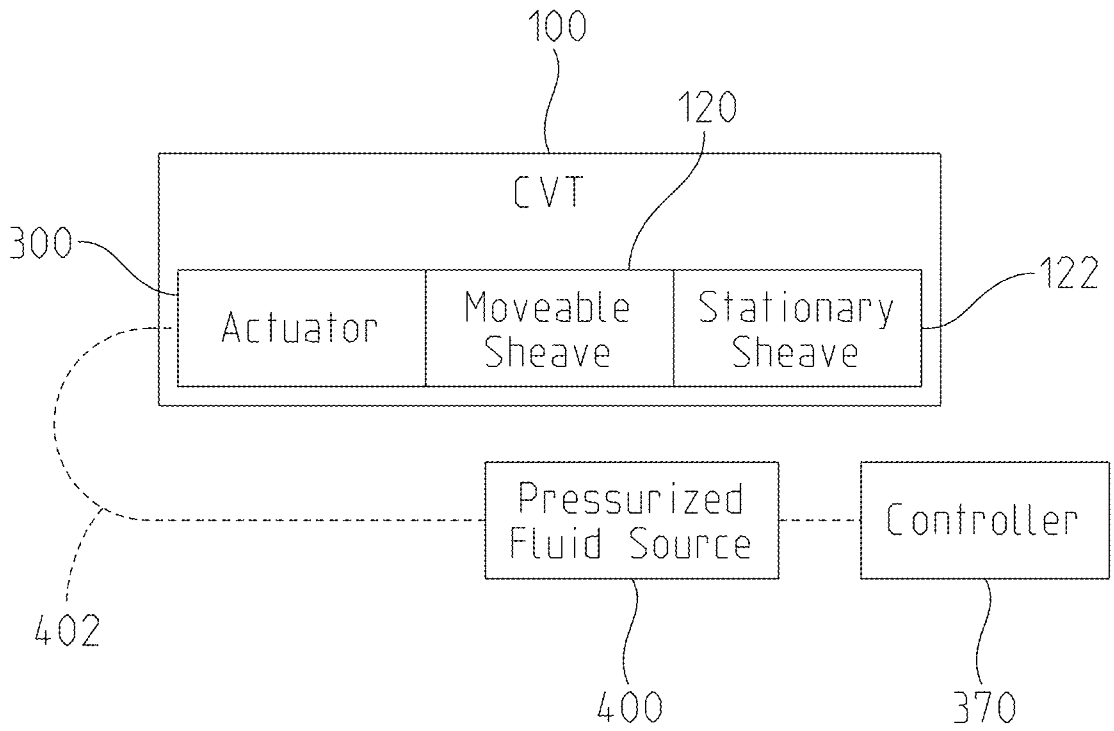
FIG. 20 is a schematic of a CVT and components controlling an actuator of the CVT, in accordance with an embodiment.
Figure 21:
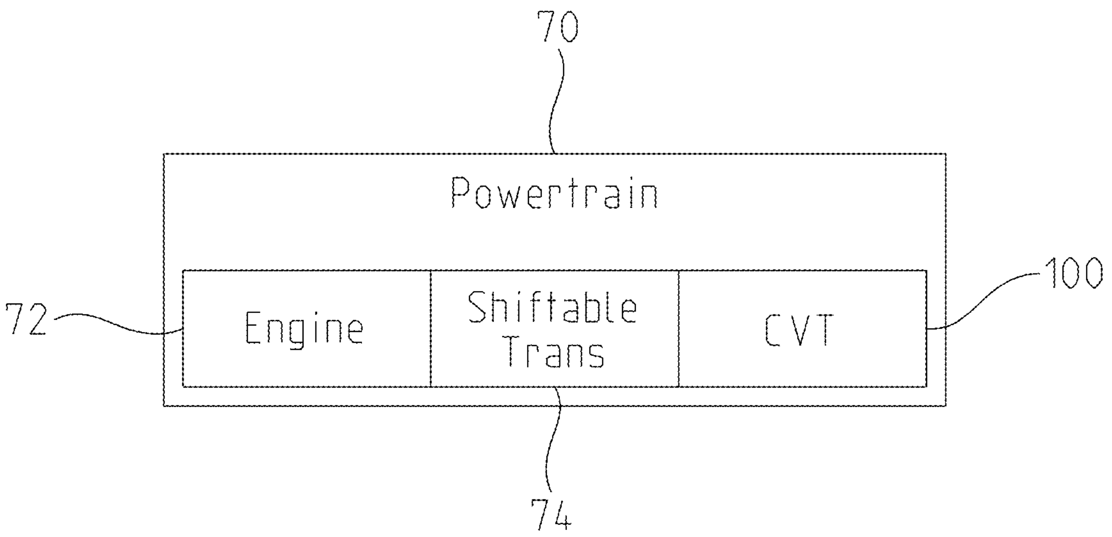
FIG. 21 is a schematic of a powertrain, in accordance with an embodiment.

Referring to FIGS. 8, 9, and 20, in some embodiments, actuator 300 may include a fluid line 402 coupling pressurized fluid source 400 and actuator 300. Actuator 300 may be positioned within the profile of rubber belt 116 and pressurized fluid source 400 may be positioned within or extends through a profile of rubber belt 116 such that rubber belt 116 is removable without removing fluid line 402 or actuator 300.

Figure 22:
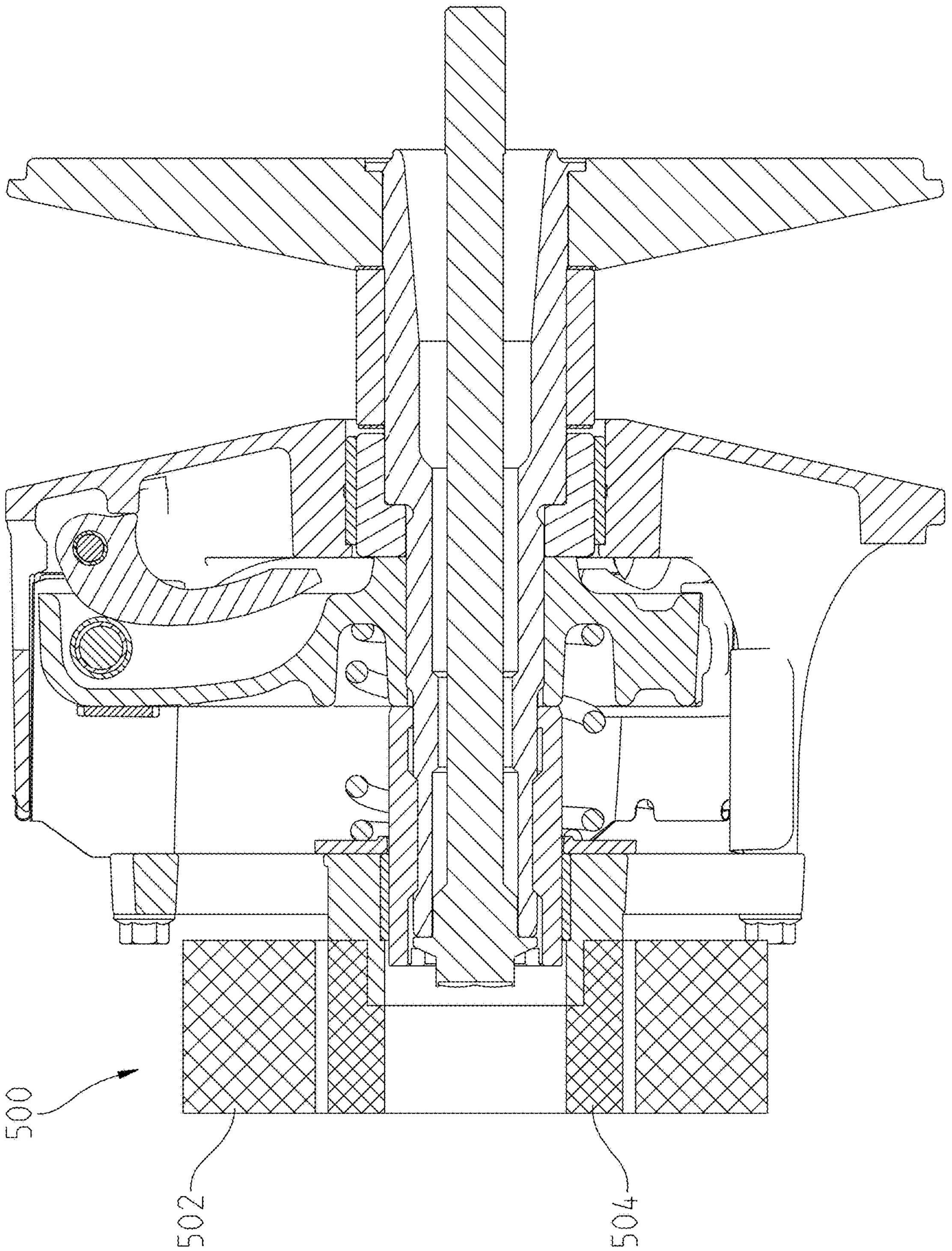
FIG. 22 is a section view of an alternative embodiment of an actuator for a CVT including a solenoid, in accordance with an embodiment.

Referring to FIG. 22, in some embodiments, actuator 300 may include an electromagnetic actuator 500. Electromagnetic actuator 500 may operate using a coil 502 and solenoid 504 to apply a force to movable sheave 120.

Turning to a discussion of CVT 100 and actuator 300 operation in vehicle 2, vehicle 2 includes the systems previously discussed including frame 10, ground engaging members 4, and powertrain assembly 70, including CVT 100 as discussed herein with actuator 300. Referring to FIG. 20, vehicle 2 further includes pressurized fluid source 400 coupled to actuator 300 via fluid line 402. Pressurized fluid source may by an independent system such as a compressor or may be integrated into other systems or may provide additional functionality such as for accessories (e.g., for filling tires). Vehicle further includes a controller 370 operably coupled to at least one of pressurized fluid source 400 and the actuator 300. Controller 370 is operable to result in actuation of actuator 300 based on predetermined conditions, user input, or combinations thereof. For example, controller 370 may send instructions to actuate actuator 300 if certain conditions such as spin burn and belt slip are detected. This can be detected by sensors (not shown) or based on relationships between wheel speed, engine speed, torque, force, ground speed, power, and throttle position (or other conditions).

Figure 23:
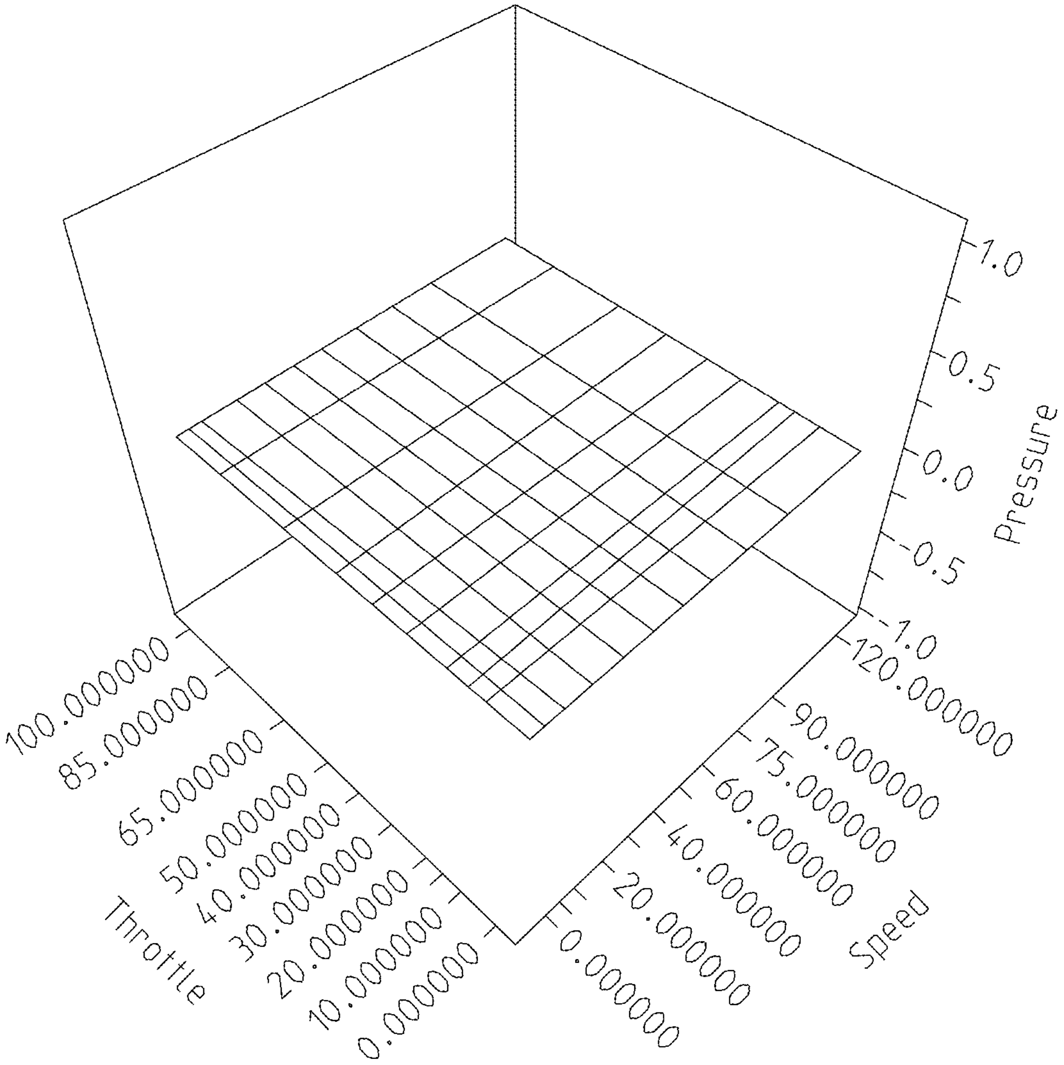
FIG. 23 is a pressure map for an actuator for a CVT in a sport drive mode, in accordance with an embodiment.
Figure 24:
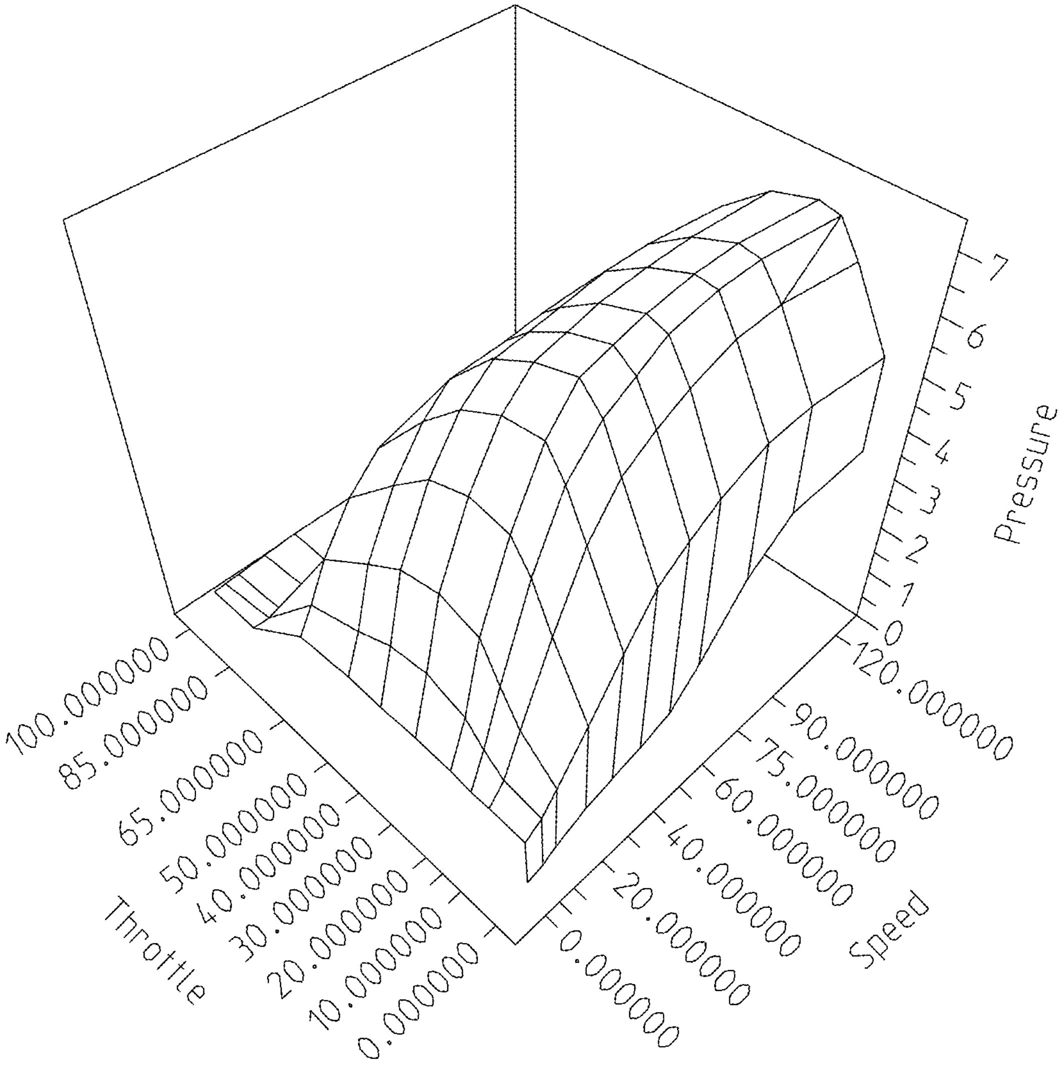
FIG. 24 is a pressure map for an actuator for a CVT in a standard drive mode, in accordance with an embodiment.
Figure 25:
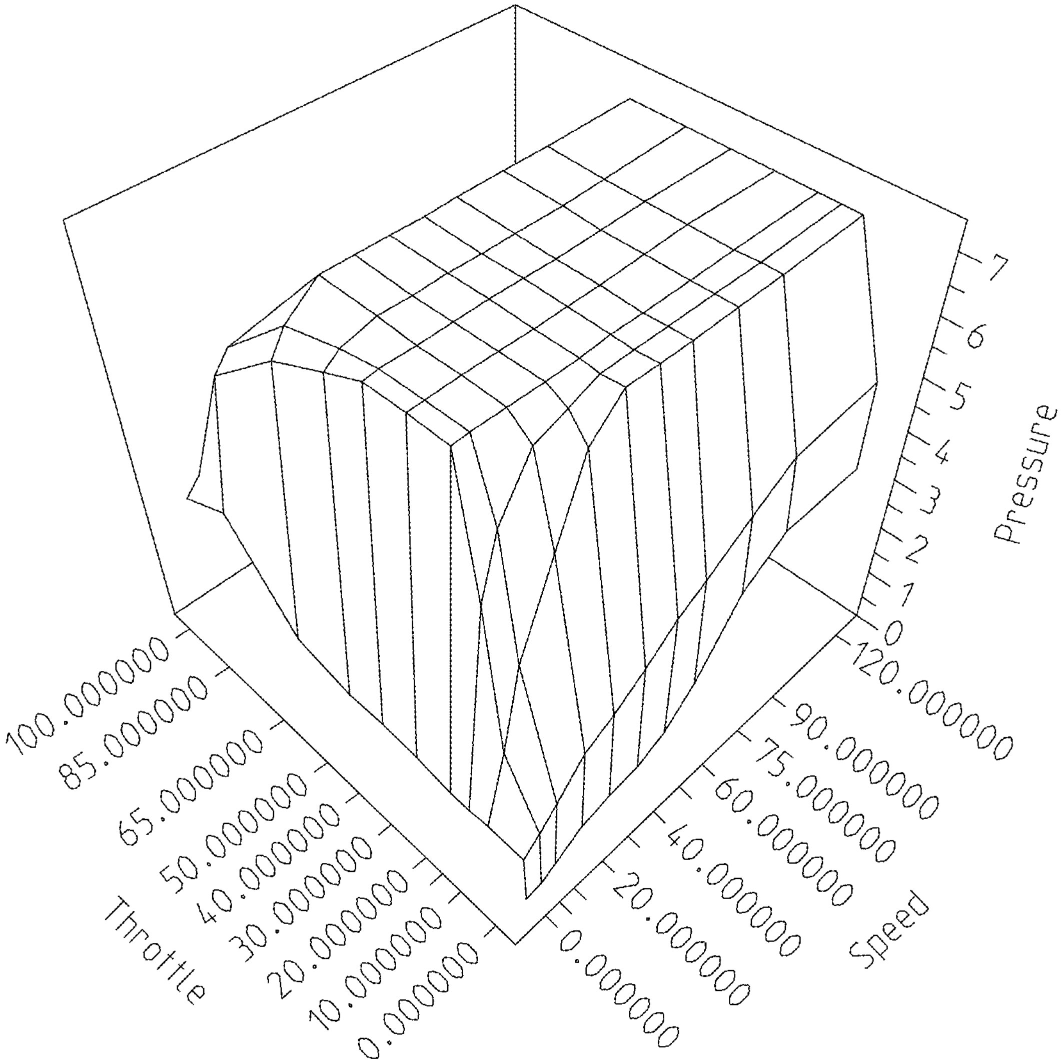
FIG. 25 is a pressure map for an actuator for a CVT in a comfort drive mode, in accordance with an embodiment.

In some embodiments, user input may result in actuation of actuator 300. For example, drive profiles may be configured such that controller 370 is operable to provide various instructions to actuator 300 and/or pressurized fluid source 400 based on the selected drive profiles. Non-limiting drive profiles include standard, comfort, and sport modes. Various instructions may be provided based on the drive profiles and conditions sensed by vehicle 2. As non-limiting examples, in embodiments implementing pressurized fluid, vehicle 2 may include pressure maps for each of the drive modes which indicates the amount of pressure to be applied via actuator 300 under various conditions. FIG. 24 illustrates a standard mode in which various pressures (Z-axis) are applied based on wheel speed (X-axis) and throttle or accelerator pedal position (Y-axis). In standard mode, pressure is applied in specific conditions that may not require specific CVT ratios for responsiveness and acceleration. For example, when a user is apparently maintaining vehicle speed, higher pressures may be applied in order to keep engine speed and noise lower whereas lower pressures or no pressure may be applied in high acceleration scenarios such as when the throttle is fully open. In comfort mode (see FIG. 25), higher pressures are applied in via actuator 300 in more scenarios to generally limit acceleration and to reduce vehicle noise. In sport mode (see FIG. 23), little-to-no pressure is applied which allows CVT 100 to function without or with minimal input from the actuator 300. The various modes may be provided as a profile which is executed by or instructions are provided by the controller 370.

Figure 26:
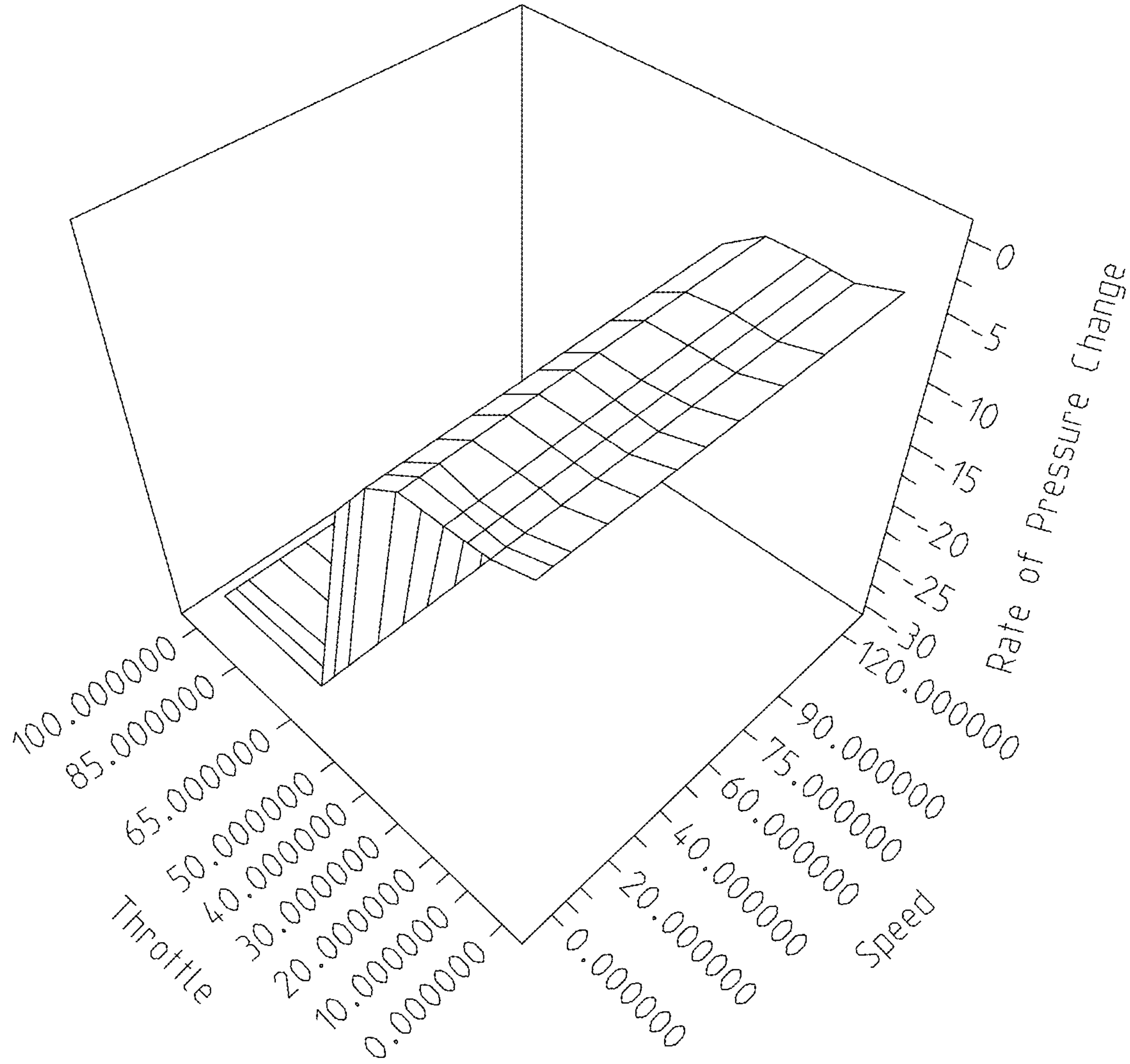
FIG. 26 is a pressure rate change map for an actuator for a CVT, in accordance with an embodiment.

Turning to FIG. 26, in some embodiments, the change in pressure applied by the actuator 300 may be rate limited. By limiting the rate based on at least one predetermined condition (e.g., wheel speed, throttle position, etc.) the rider experience may be altered. For example, at low speeds or low-throttle input, the rate of change of pressure changes is lower in order to limit sudden changes to the CVT ratio. At low speeds, sudden changes in the CVT ratio may result in a less smooth rider experience and thus the rate limiting may smooth out the rider experience. It is understood that other factors may be implemented in determining the rate of pressure change allowable including torque, force, speed (e.g., engine, wheel, or vehicle), brake state, brake pressure, and vehicle state (e.g., airborne).

In some embodiments, actuator 300, pressurized fluid source 400, and/or valve block (not shown) may be provided with various features for facilitating a vent-to-atmosphere function for a control safe in case of failures relating to the system. Similar to the discussion with respect to FIG. 19, actuator 300 may be provide with vent-to-atmosphere in order to allow CVT 100 to retain typical or manual functionality provided by the mechanical components of CVT 100 if failure occurs with actuator 300.

Figure 27:
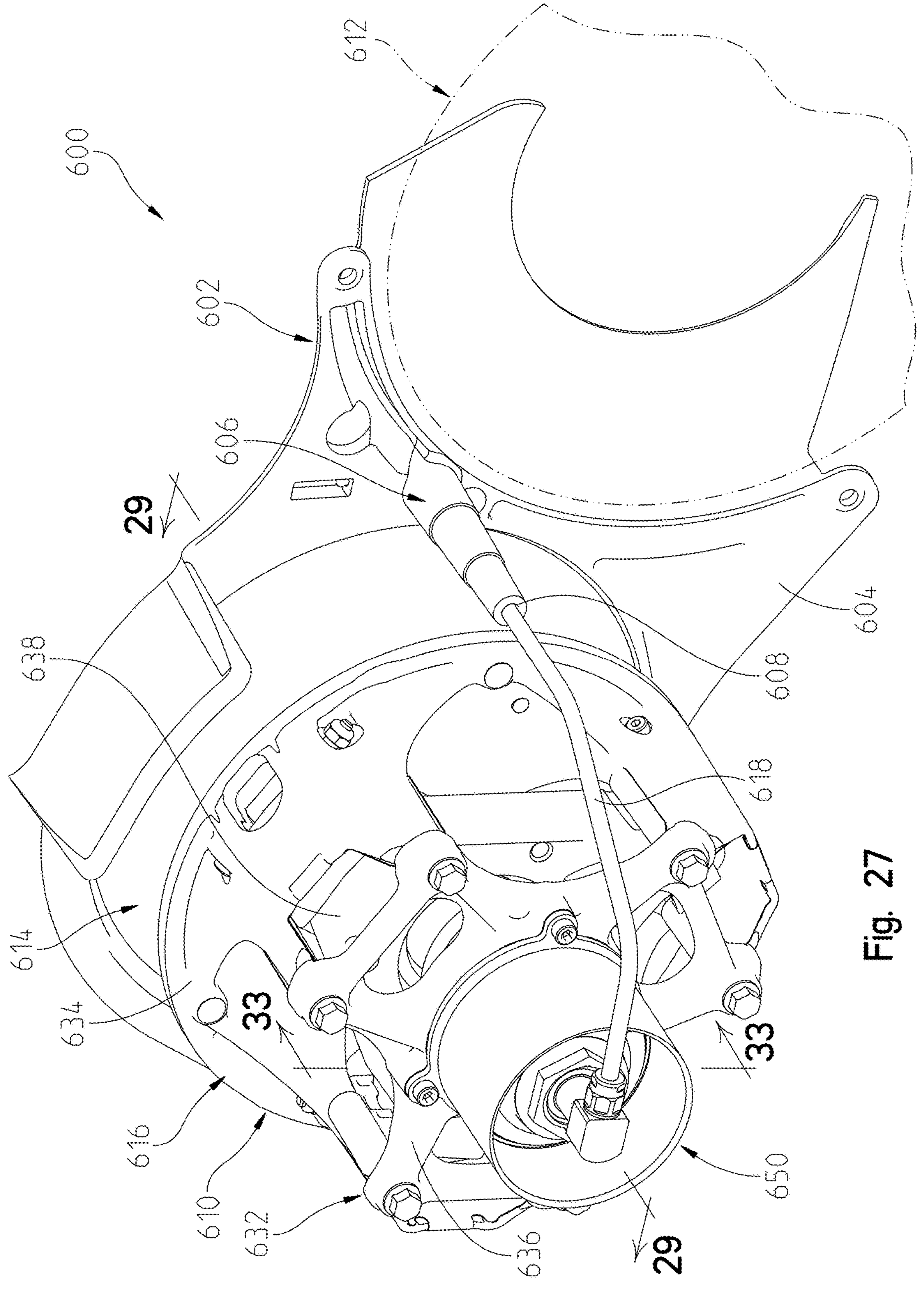
FIG. 27 is a perspective view of an alternative CVT, in accordance with an embodiment.
Figure 28:
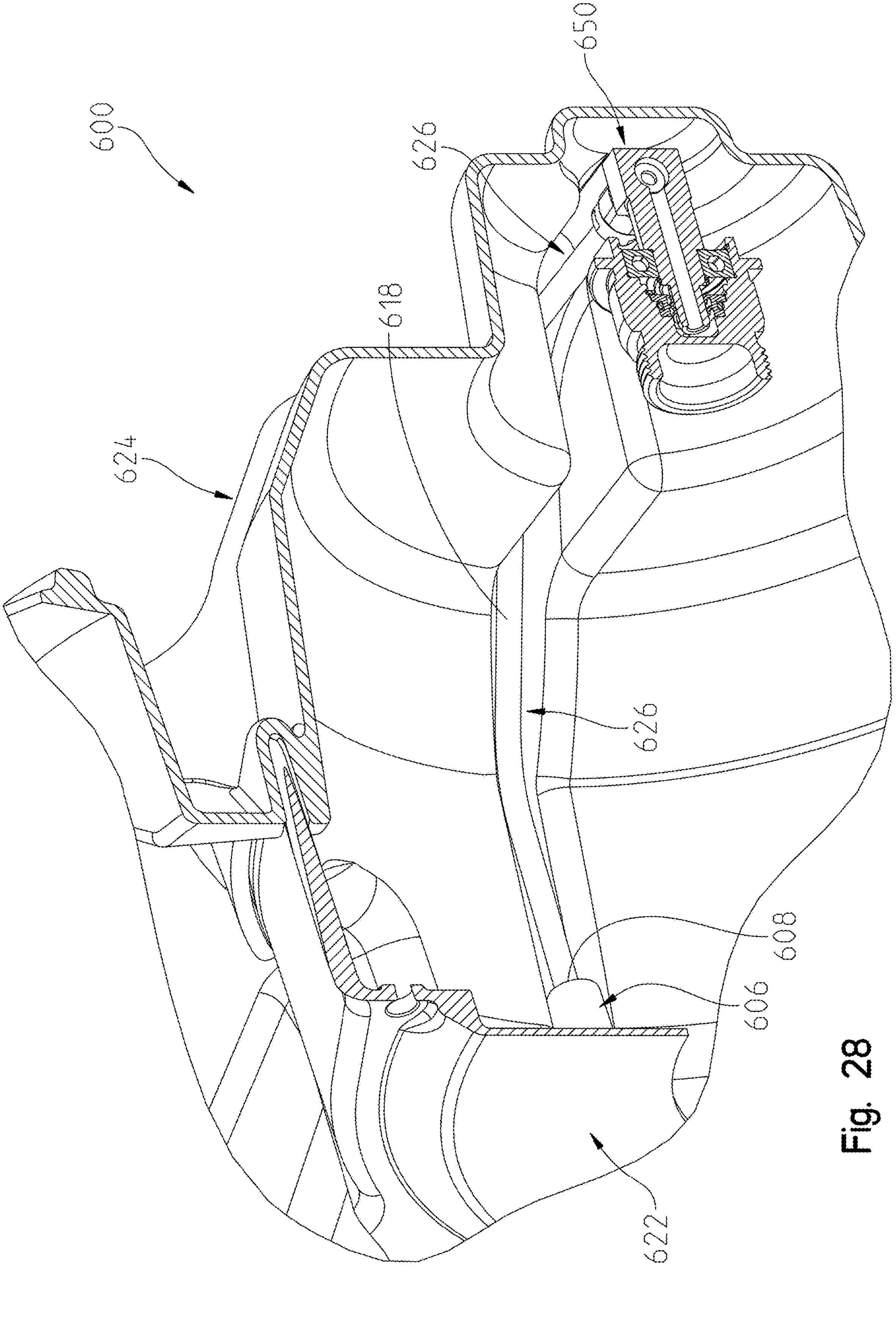
FIG. 28 is a perspective view of an outer cover of a CVT, in accordance with an embodiment.

Referring now to FIGS. 27-28, an alternative continuously variable transmission (CVT) 600 is shown and may be similar to CVT 100. CVT 600 includes an inner cover 622, an outer cover 624, and a plate member 602 coupled to the inner cover 622. Plate member 602 defines a center portion 604 and an extension member 606 extending outwardly from the center portion 604 toward the outer cover 624. Extension member 606 defines an aperture 608 positioned on an axial extent of extension member 606. In embodiments, extension member 606 is integral with plate member 602. CVT 600 includes a drive clutch 610, a driven clutch 612 and a bearing 615 (FIG. 29) positioned between the drive clutch 610 and the driven clutch 612. In embodiments, an endless member (not shown) may rotate around bearing 615. Drive clutch 610 is rotatably coupled to a prime mover (not shown, e.g., an engine, an electric motor, or another prime mover) and operable to be rotated by the prime mover.

Figure 29:
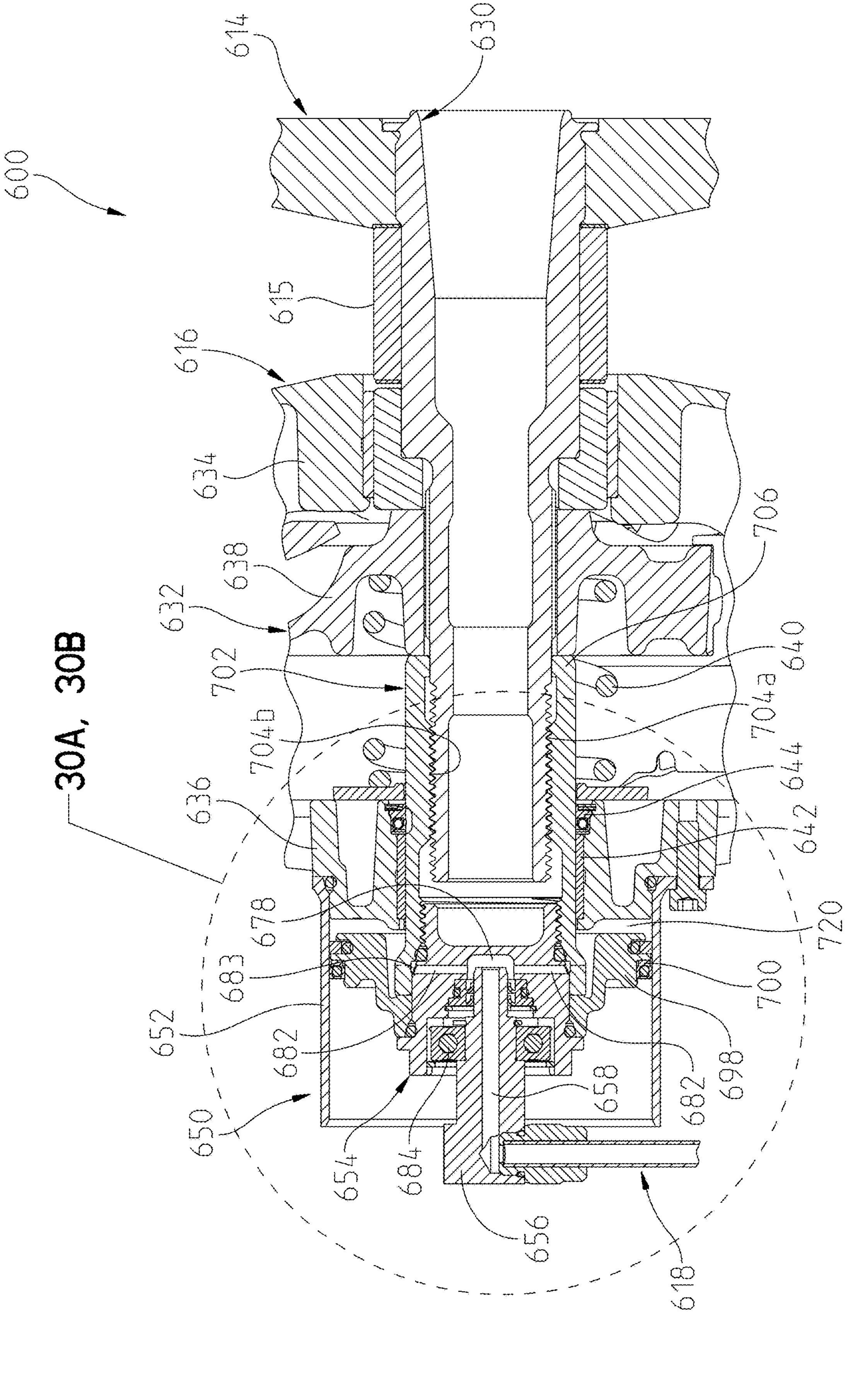
FIG. 29 is a cross-section view of the CVT of FIG. 27 shown in an unactuated position, taken along line 29-29 in FIG. 27, in accordance with an embodiment.

Drive clutch 610 includes a stationary sheave 614 and a moveable sheave 616 each supported by an input shaft 630 (FIG. 29). In embodiments, moveable sheave 616 is operable to translate along input shaft 630 relative to stationary sheave 614 to change the spacing between sheaves 614, 616 and alter the input-to-output ratio of CVT 600. In embodiments, input shaft 630 includes outer threads 704*a* positioned at an axially extent of the input shaft 630.

Referring still to FIGS. 27-28, an actuator assembly 650 is operably coupled to drive clutch 610. In embodiments, actuator assembly 650 is operably coupled to moveable sheave 616 of drive clutch 610. A fluid conduit 618 is operably coupled between extension member 606 and actuator assembly 650. That is, fluid conduit 618 is fluidly coupled to aperture 608 of extension member 606 and actuator assembly 650. Fluid conduit 618 is operably coupled to a pressurized fluid source (e.g., pressurized fluid source 400) to provide a fluid (e.g., air, water, other types of fluid) to the actuator assembly 650. That is, fluid conduit 618 may operate substantially similarly to fluid line 402 and provide fluid to actuator assembly 650 from pressurized fluid source (e.g., pressurized fluid source 400).

Referring now to FIG. 28, outer cover 624 defines a recessed portion 626 and the fluid conduit 618 is configured to be positioned within recessed portion 626. In embodiments, the entirety of fluid conduit 618 is positioned within recessed portion 626. In embodiments, only a portion of fluid conduit 618 is positioned within recessed portion 626. In embodiments, recessed portion 626 may include one or more retention features (not shown) to hold the fluid conduit 618 within the recessed portion 626.

Referring still to FIGS. 27-28, drive clutch 610 of CVT 600 includes a spider assembly 632 operable to facilitate movement of the moveable sheave 616. Spider assembly 632 includes a base 634 coupled to moveable sheave 616, a cover 636 coupled to base 634, and a spider 638 movably engaged with the base 634. A biasing member (e.g., a spring 640) is coupled intermediate the cover 636 and spider 638. Spider assembly 632 includes a plurality of weights (e.g., weights 136, FIG. 11). With spider assembly 632, moveable sheave 616 translates along input shaft 630 to alter the CVT ratio of CVT 600.

Figure 30A:
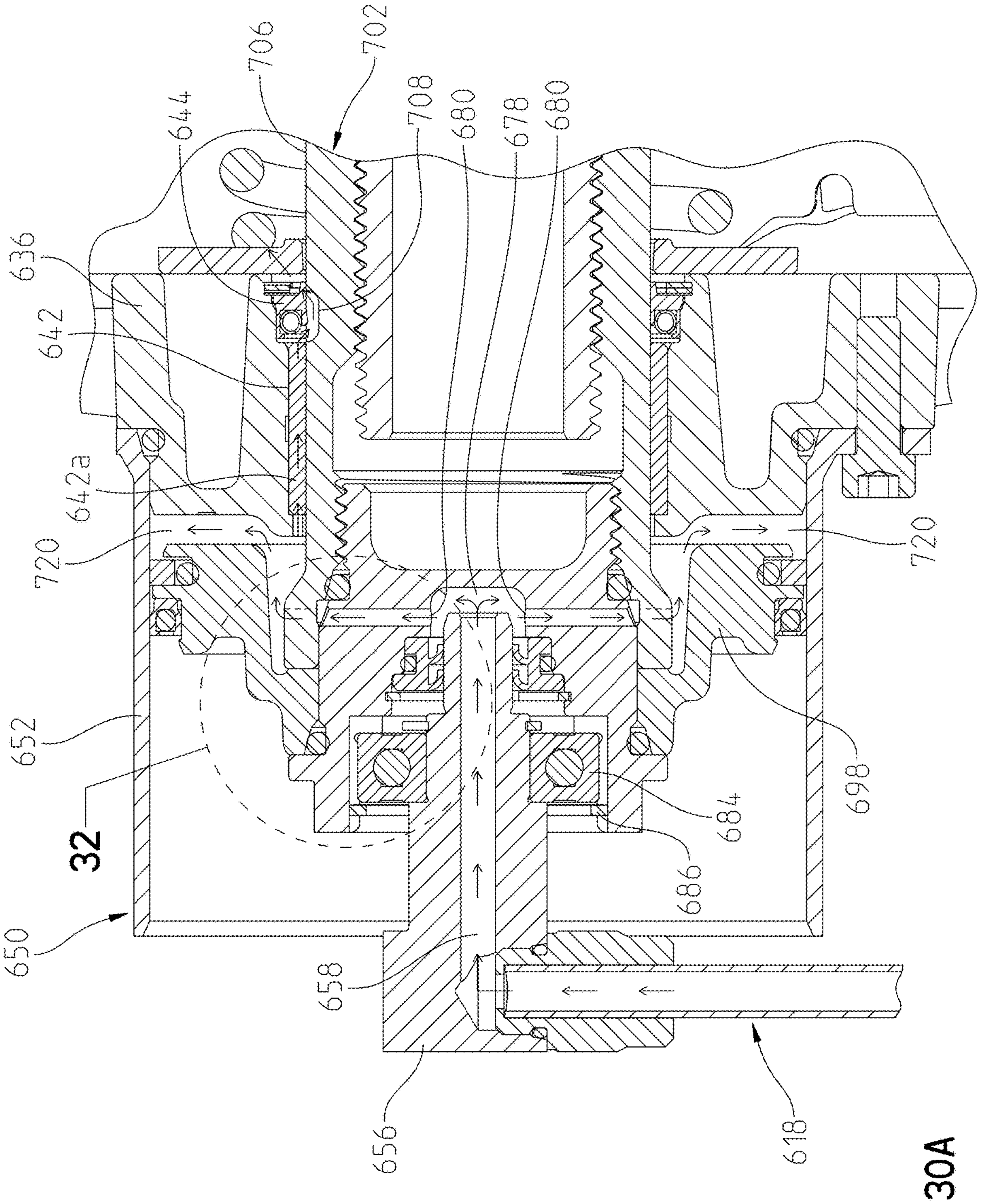
FIG. 30A is an isolated view of a portion of the cross-section of FIG. 29, taken at section 30A, 30B of FIG. 29, in accordance with an embodiment.
Figure 30B:
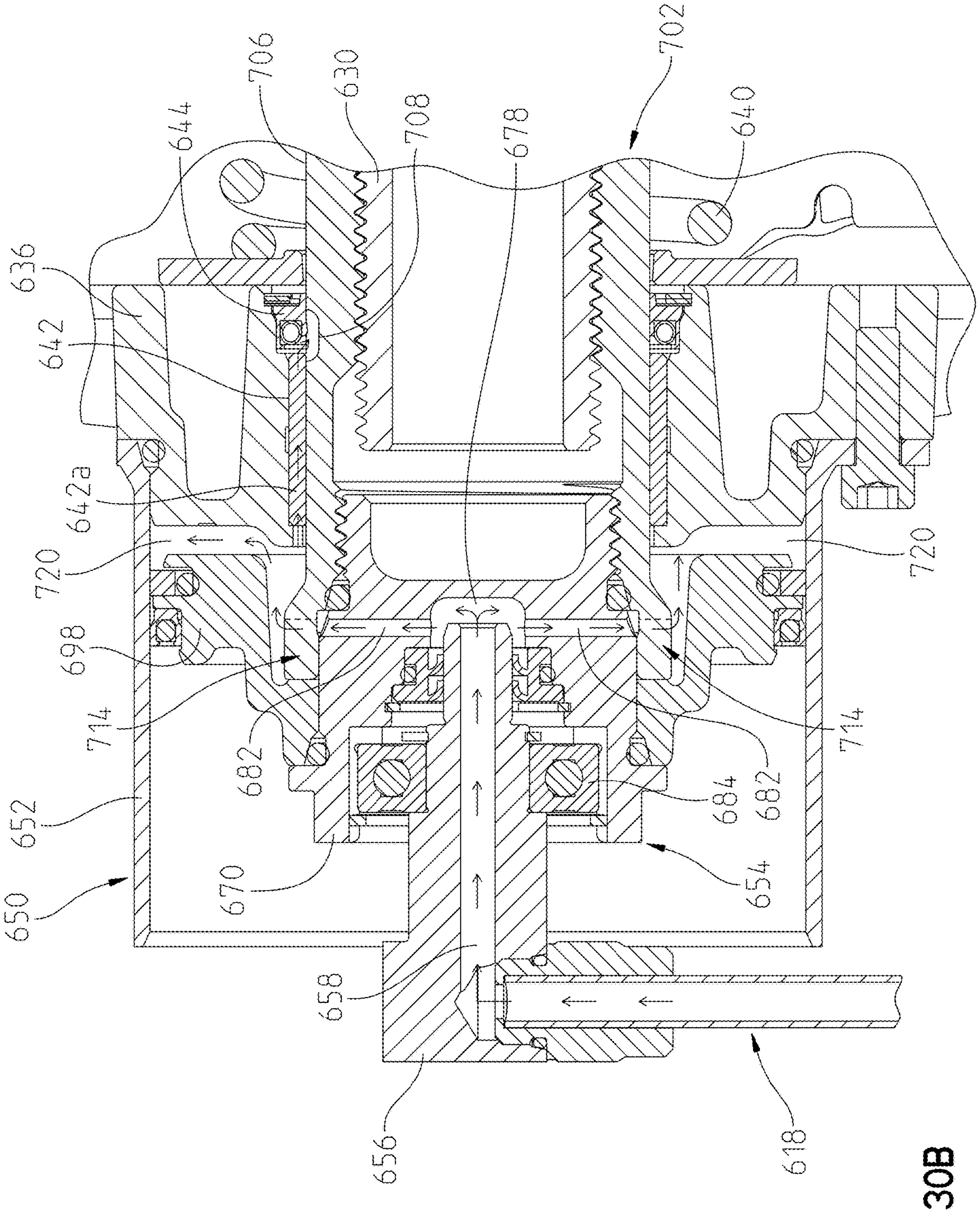
FIG. 30B is an isolated view of a portion of the cross-section of FIG. 29, taken at section 30A, 30B of FIG. 29, in accordance with an embodiment.
Figure 31:
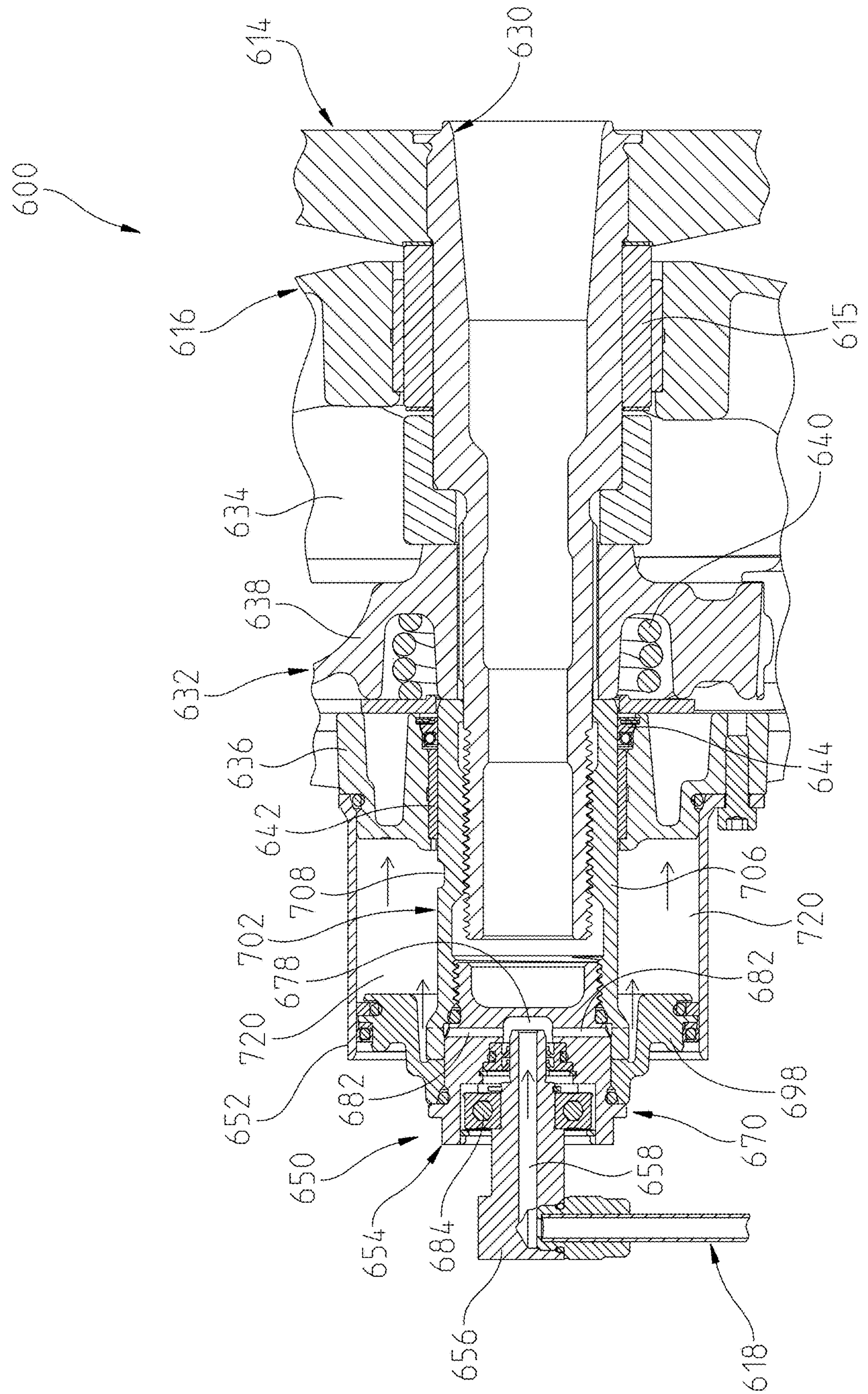
FIG. 31 is a cross-section view of the CVT of FIG. 27 shown in an actuated position, taken along line 29-29 in FIG. 27, in accordance with an embodiment.

Referring now to FIGS. 29-31, actuator assembly 650 includes a cylinder 652 (e.g., similar to cylinder 304) coupled to cover 636. Actuator assembly 650 includes a rotary union 654 positioned within the cylinder 652. Rotary union 654 includes an input nozzle 656 defining a channel 658 and a coupling portion 670. A crown 698 is coupled between rotary union 654 and cylinder 652. That is, crown 698 is sized and shaped to sit within cylinder 652 and each of crown 698 and rotary union 654 cooperate to sealingly couple with cylinder 652. At least one seal or gasket 700 is coupled between crown 698 and cylinder 652.

Figure 35:
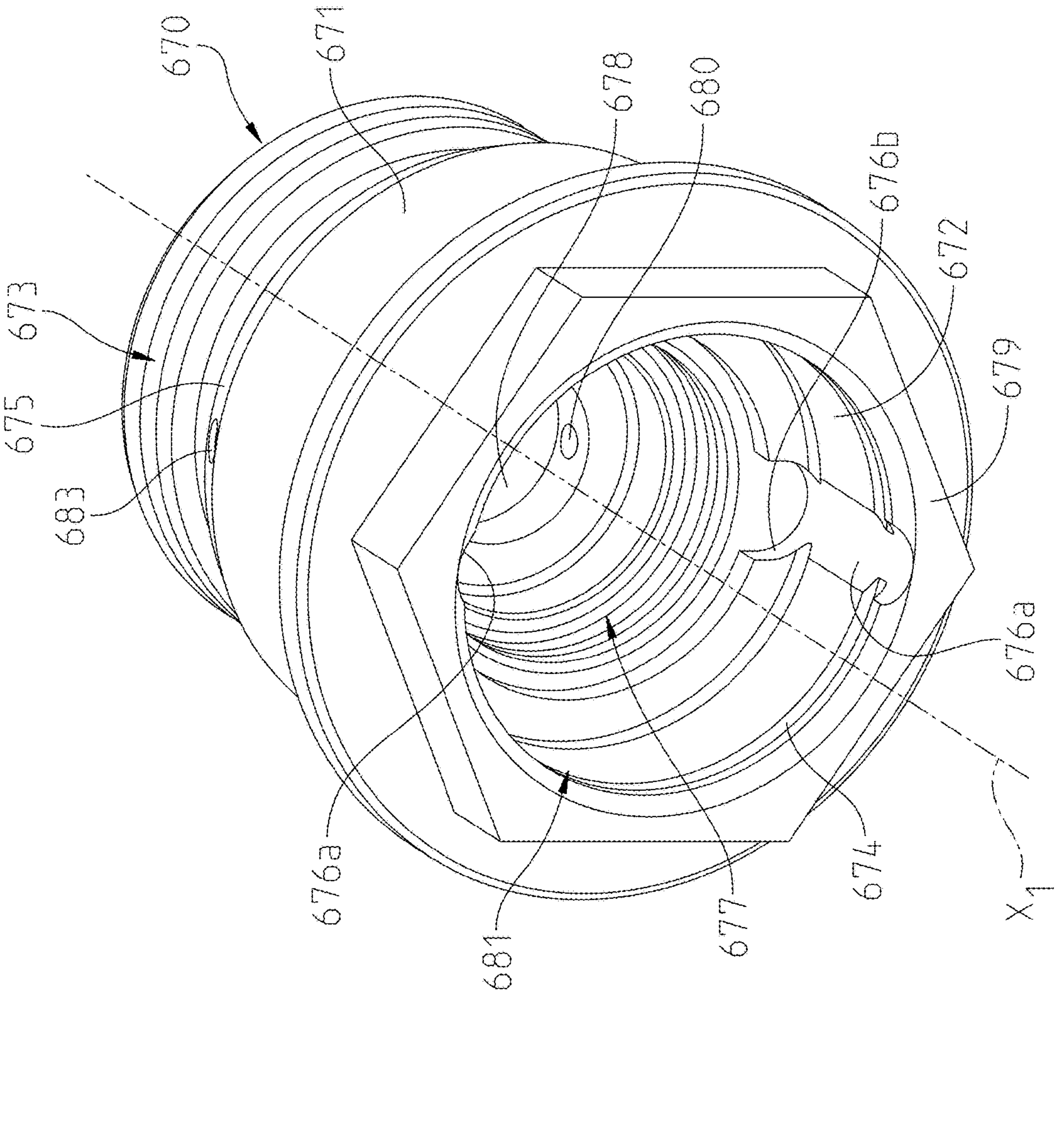
FIG. 35 is a perspective view of a coupling member of an actuator assembly for a CVT, in accordance with an embodiment.

Referring now to FIG. 35, coupling portion 670 extends along an axis X1 and is generally cylindrical. Coupling portion 670 defines a first body portion 671 and a second body portion 673 axially offset from the first body portion 671. In embodiments, second body portion 673 is a threaded portion. A chamfered portion 675 is positioned axially intermediate first body portion 679 and second body portion 673. In embodiments, chamfered portion 675 includes a pair of apertures 683. Coupling portion 670 includes an axial face 679 defining a cavity 681. Cavity 681 includes a first cylindrical portion 672 and a first recess 674 positioned adjacent the first cylindrical portion 672. A recessed portion 677 is axially offset from the first cylindrical portion 672. A first recessed portion 676*a* extends through each of first cylindrical portion 672 and first recess 674 and a second recessed portion 676*b* is axially adjacent first recessed portion 676*a*. In embodiments, cavity 681 defines a pair of angularly offset and matching recessed portions 676*a*, 676*b*. That is, as shown in FIG. 35, cavity 681 defines two diametrically opposed recessed portions 676*a*, 676*b*. Cavity 681 further defines a recessed portion 678 positioned along the axis X1 and the cavity 681 defines a pair of apertures 680. In embodiments, a pair of channels 682 extend between each pair of apertures 680, 683, respectively. That is, channels 682 provide an outlet from recessed portion 678 within cavity 681.

Figure 34:
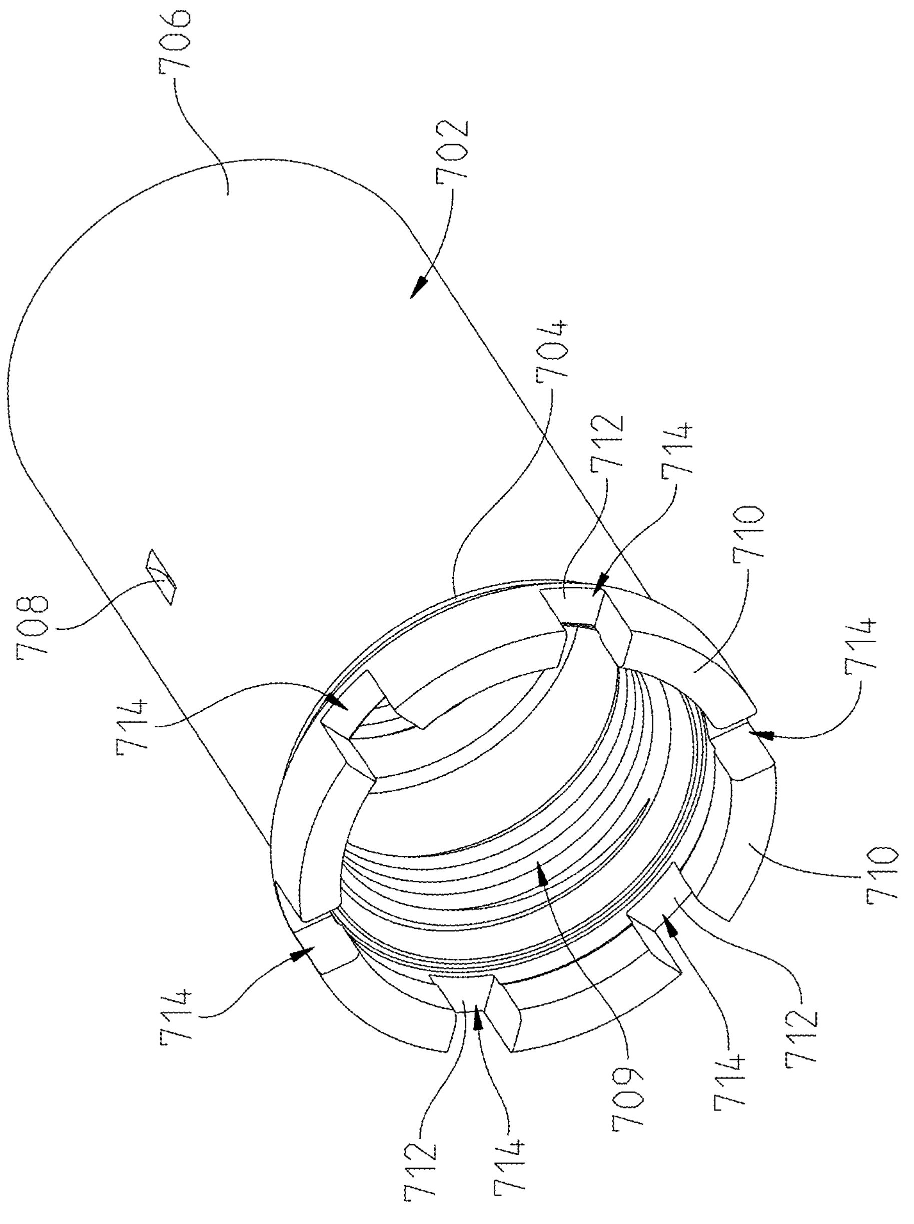
FIG. 34 is a perspective view of a sleeve member of an actuator assembly for a CVT, in accordance with an embodiment.

Referring again to FIGS. 29-31, a bearing 684 sits within first cylindrical portion 672 and is positioned intermediate first cylindrical portion 672 of coupling portion 670 and channel 658, and bearing 684 allows coupling portion 670 to rotate about input nozzle 656. A washer 686 (e.g., a C-clip) sits within first recess 674 and constrains bearing 684 from exiting cavity 681. In embodiments, a sleeve member 702 is rotatably coupled to coupling portion 670. Referring to FIG. 34, sleeve member 702 includes a generally cylindrical body 706 defining a slot 708. In embodiments, slot 708 is a generally arcuate slot having an arcuate profile within body 706. Body 706 includes a plurality of extensions 710 extending axially outwardly from body 706. A plurality of recessed portions 712 are positioned intermediate the plurality of extensions 710 to define a plurality of apertures. Sleeve member 702 is hollow and includes a first set of inner threads 709 and a second set of inner threads 704*b* (FIG. 29). Referring again to FIG. 29, sleeve member 702 is fixedly coupled to coupling portion 670 by the first set of inner threads 709 mating with the threads of second body portion 673 and sleeve member 702 is fixedly coupled to input shaft 630 by the second set of inner threads 704*b* mating with the threads 704*a* of input shaft 630.

Referring again to FIGS. 29-31, a bearing 642 is positioned radially intermediate the cover 636 of spider assembly 632 and sleeve member 702 and a seal 644 is positioned axially adjacent the bearing 642. Cover 636 may rotate about sleeve member 702 on bearing 642. Bearing 642 may include a channel 642*a* extending axially along bearing 642. Bearing 642 may include a plurality of channels 642*a*. In embodiments, bearing 642 is rotatably fixed to sleeve member 702 and channel 642*a* is radially aligned with slot 708 on sleeve member 702.

Figure 32:
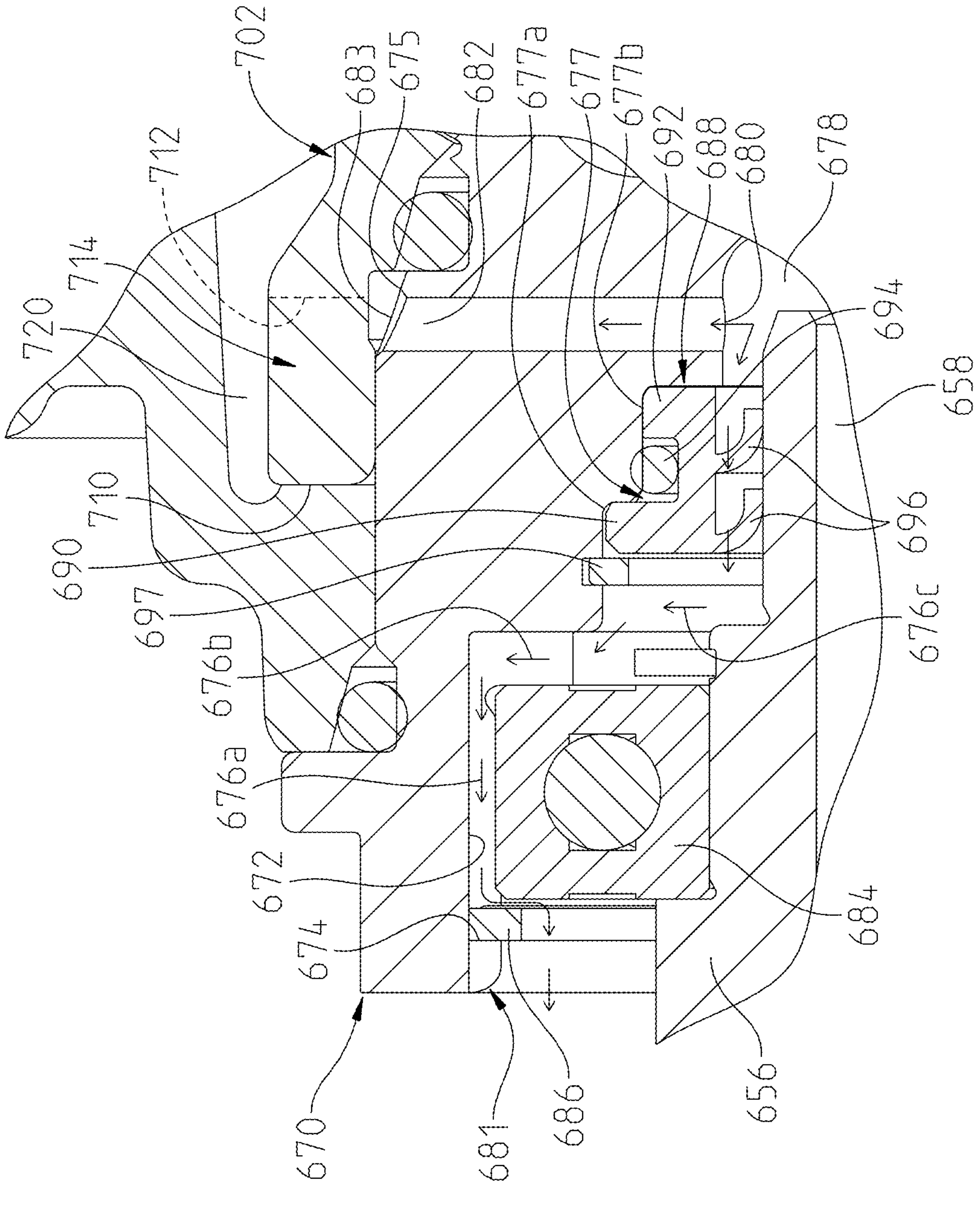
FIG. 32 is an isolated view of a portion of the cross section of FIG. 29, taken at section 32 of FIG. 30A, in accordance with an embodiment.

Referring now to FIG. 32, recessed portion 677 of coupling portion 670 defines a first portion 677*a* and a second portion 677*b*. Portions 677*a*, 677*b* are defined by varied heights (e.g., within cavity 681, first portion 677*a* has a greater diameter than second portion 677*b*). A seal member 688 includes a first extension portion 690 and a second extension portion 692 separated from the first extension portion 690. A round seal 694 is positioned intermediate the first extension portion 690 and the second extension portion 692. First extension portion 690 is sized and shaped to contact first portion 677*a* and second extension portion 692 is sized and shaped to contact second portion 677*b*. Seal 688 includes a pair of sealing lips 696 extending downwardly and in contact with input nozzle 656. A retainer washer 697 is positioned axially adjacent seal 688 and ensures seal 688 maintains a relatively consistent position. The multi-dimensional profile of seal 688 (e.g., the varied heights of first extension portion 690 and second extension portion 692) ensures that seal 688 is installed correctly within recessed portion 677 of cavity 681.

Referring again to FIGS. 29-31, actuator assembly 650 cooperates with the spider assembly 632 to actuate moveable sheave 616 of drive clutch 610. In embodiments, a chamber 720 is defined between crown 698 and cover 636. Chamber 720 is filled with pressurized air by actuator assembly 650 which pushes cover 636 of spider assembly 632 and cylinder 652 of actuator assembly 650 toward moveable sheave 616 of drive clutch 610. Moveable sheave 616 translates with cover 636 of spider assembly 632 because cover 636 is coupled with base 634. Actuator assembly 650 can directly control a spacing of the moveable sheave 616 and stationary sheave 614 of drive clutch 610. Spider assembly 632 may also control the spacing of drive clutch 610 based upon the centrifugal forces exerted when input shaft 630 is rotated.

Referring still to FIGS. 29-31, CVT 600 remains unactuated until the input shaft 630 reaches a predetermined engagement speed (e.g., a predetermined engine speed (RPM)). Once CVT 600 reaches the engagement speed, the centrifugal forces exerted on drive clutch 610 exceeds the force required to move the weights (e.g., weights 136) and compress biasing member 640, thereby rotating the weights and translating the moveable sheave 616 to alter the CVT ratio of CVT 600 (e.g., CVT 600 operates similarly to CVT 100). The moveable sheave 616 translates toward the stationary sheave 614, thereby increasing the effective rotational diameter of the drive clutch 610 and altering the CVT ratio of CVT 600.

As moveable sheave 616 translates towards stationary sheave 614 under the centrifugal forces of the spider assembly 632, cover 636 of spider assembly 632 moves with moveable sheave 616 along sleeve member 702. In an unactuated position, moveable sheave 616 is in a first position (FIGS. 29-30) and the seal 644 is positioned axially along sleeve member 702 aligned with slot 708 such that a fluid (e.g., air) is capable of moving through slot 708 around seal 644. In an actuated position, or a second position, cover 636 of spider assembly 632 and seal 644 translate along sleeve member 702 such that seal 644 is positioned axially along sleeve member 702 such that a fluid (e.g., air) is incapable of moving through slot 708 around seal 644 (e.g., blocked). That is, in the first actuated position, air may flow into slot 708 but may not flow out of slot 708 because it is blocked by seal 644.

Figure 33:
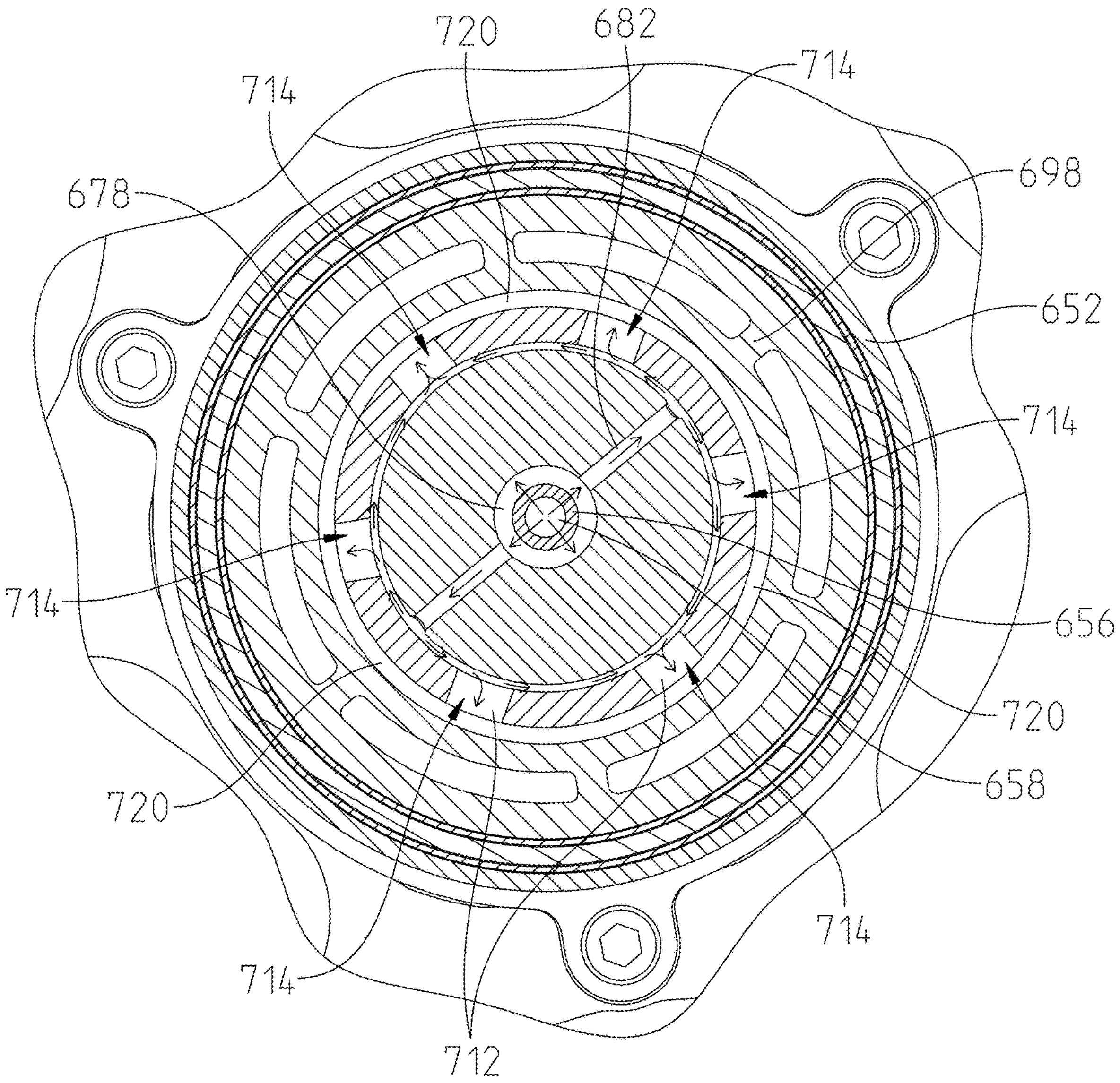
FIG. 33 is a cross-section view of a rotary of an actuator assembly of the CVT of FIG. 27, taken along line 33-33 of FIG. 27, in accordance with an embodiment.

Referring now to FIGS. 30A-30B and 33, a fluid (e.g., air) may flow through conduit 618 and into channel 658 in input nozzle 656. The fluid will flow through channel 658, through rotary union 654 and into recessed portion 678. The fluid (e.g., air) will be forced through apertures 680, channel 682, and out of apertures 683. Fluid is forced out of aperture 683 on the chamfered portion 675 and through recessed portions 712 defined by sleeve member 702. The fluid (e.g., air) is forced through recessed portions 712 and into chamber 720. The drive clutch 610 is in the unactuated position, e.g., the first position, the fluid (e.g., air) may flow from chamber 720 and through bearing 642 and slot 708 around seal 644 to the surrounding atmosphere. That is, when drive clutch 610 is in the unactuated position (e.g., when the prime mover is not rotating), pressure is incapable of building up within chamber 720 because the fluid (e.g., air) escapes through channel 642*a* within bearing 642 and slot 708. The position of slot 708 assists in preventing actuator assembly 650 from acting on moveable sheave 616 when the prime mover is not operating. That is, slot 708 acts similar to a release valve.

Once drive clutch 610 is in the actuated position, e.g., the second position, the fluid (e.g., air) is blocked from flowing to the surrounding atmosphere because the seal 644 blocks slot 708, and therefore, pressure may build up within chamber 720.

Referring now to FIG. 31, air is forced into chamber 720 and pressure within the chamber 720 builds up and a force is exerted on cover 636 translating the moveable sheave 616 along the input shaft 630. The pressure created within chamber 720 may be varied to alter a position of the moveable shave 616 to control the effective diameter of the drive clutch 610 and the CVT ratio of CVT 600. That is, as the pressure within chamber 720 is increased, the moveable sheave 616 is translated toward stationary sheave 614.

Referring now to FIG. 32, seal 688 is adapted to prevent air from moving into or out of recessed portion 678 from adjacent the input nozzle 656. In embodiments, a third recessed portion 676*c* is created between bearing 684 and seal 688. An air path is created between third recessed portion 676*c* and the surrounding atmosphere to prevent pressure from building up within third recessed portion 676*c*. The air path is defined by each of the first recessed portion 676*a* and the second recessed portion 676*b* such that air can flow between washer 686 and bearing 684, through first recessed portion 676*a*, and through second recessed portion 676*b*. This air path prevents or reduces the probability that pressure increases within third recessed portion 676*c*, which helps preserve the life or usability of each of the bearing 684 and seal 688. Increased pressure within third recessed portion 676*c* may exert increased and unnecessary pressure on each of bearing 684 and seal 688, reducing the effectiveness or lifespan of the surrounding components.

Figure 36:
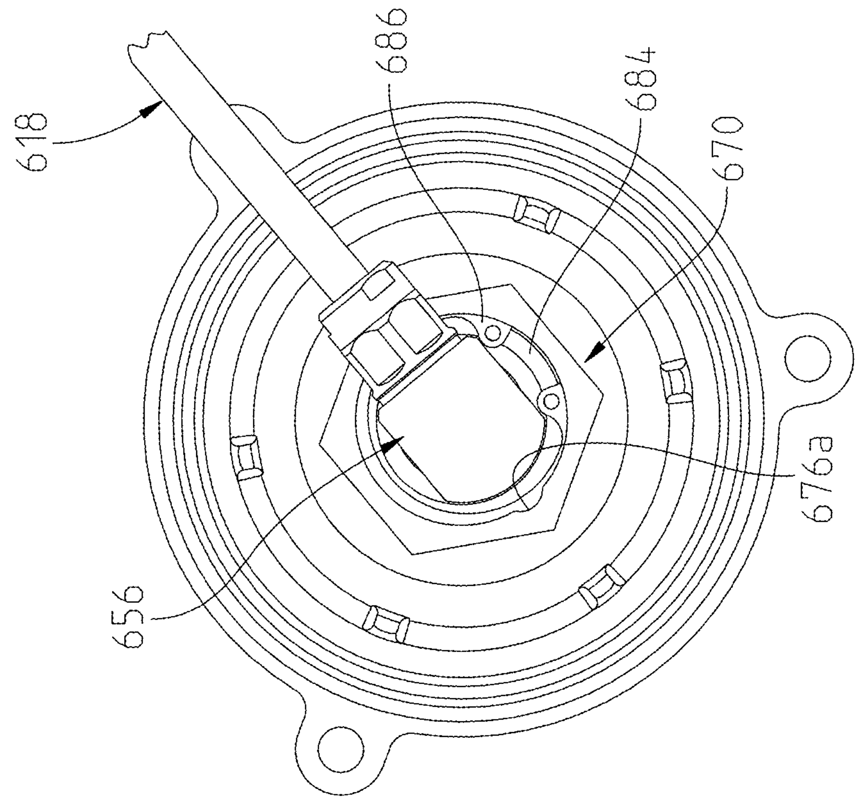
FIG. 36 is a side view of an actuator assembly for a CVT, in accordance with an embodiment.

Referring now to FIG. 36, input nozzle 656 is sized and shaped to fit within the rotary union 654. C-clip 686 is also sized and shaped to fit around input nozzle 656 and be seated within recess 674 in coupling portion 670.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A continuously variable transmission including:
a driven clutch;
a drive clutch operably coupled to the driven clutch, the drive clutch including a stationary sheave, a moveable sheave positioned adjacent to the stationary sheave along a common axis of defined by a shaft and operable to translate axially relative to the stationary sheave, and a load member;
a spider nut;
a belt extending between the drive clutch and the driven clutch; and
an actuator coupled to the moveable sheave of the drive clutch, the actuator operable to apply a force to the moveable sheave in a direction towards the stationary sheave and substantially along or parallel to the common axis, wherein the actuator includes a piston fixed to the spider nut and a cylinder fixed to the movable sheave.

2. The continuously variable transmission of claim 1, wherein the actuator is one of a pneumatic actuator, hydraulic actuator, and an electromagnetic actuator.

3. The continuously variable transmission of claim 1, wherein the actuator is coupled to the to the shaft.

4. The continuously variable transmission of claim 1, wherein a chamber is defined between the piston and the moveable sheave, the chamber configured to receive a pressurized fluid from a pressurized fluid source.

5. The continuously variable transmission of claim 4, wherein the piston is fixedly positioned relative to the shaft and the cylinder is axially moveable relative to the shaft.

6. The continuously variable transmission of claim 5, wherein the actuator includes a nozzle fluidly coupled to the chamber.

7. The continuously variable transmission of claim 6, wherein the nozzle is coupled to the piston and wherein the piston and spider nut define a channel such that the nozzle is fluidly coupled to the chamber via the channel.

8. A vehicle comprising:
a frame and defining an operator area;
a plurality of ground engaging members configured to support the frame;
a powertrain assembly supported by the frame, the powertrain assembly including:
an engine operably coupled to at least one of the plurality of ground engaging members; and
a continuously variable transmission driven by the engine, the continuously variable transmission including:
a driven clutch;
a drive clutch operably coupled to the driven clutch, the drive clutch including a stationary sheave, a moveable sheave positioned adjacent to the stationary sheave along a common axis of defined by a shaft and operable to translate axially relative to the stationary sheave, and a load member;
a spider nut;
a belt extending between the drive clutch and the driven clutch; and
an actuator coupled to the moveable sheave of the drive clutch, the actuator operable to apply a force to the moveable sheave in a direction towards the stationary sheave and substantially along or parallel to the common axis, wherein the actuator includes a piston fixed to the spider nut and a cylinder fixed to the movable sheave.

9. The vehicle of claim 8, wherein the continuously variable transmission includes:
a chamber defined by the cylinder between the piston and the moveable sheave; and
a nozzle of the actuator coupled to the piston and fluidly coupled to the chamber.

10. The vehicle of claim 9, further comprising a pressurized fluid source coupled to the actuator.

11. The vehicle of claim 10, further comprising a controller operably coupled to at least one of the pressurized fluid source and the actuator, the controller operable to result in actuation of the actuator based on predetermined conditions.

12. The vehicle of claim 11, wherein the predetermined conditions include at least one of ground engaging member speed and throttle position.

13. The vehicle of claim 11, wherein the controller includes at least first drive profile and a second drive profile, wherein the controller results in the actuator applying a first force to the moveable sheave based on a first predetermined condition when in the first drive profile and a second force to the moveable sheave based on the first predetermined condition when in the second drive profile, wherein the first force is different from the second force.

14. The vehicle of claim 11, wherein the controller is configured to limit a rate of change in force applied to by the actuator based on at least one of ground engaging member speed and throttle position.

15. The vehicle of claim 10, wherein the pressurized fluid source includes one of air and hydraulic oil.

16. The vehicle of claim 10, further comprising a fluid line coupling the pressurized fluid source and the actuator, wherein the actuator is positioned within the profile of the belt and the pressurized fluid source is positioned within or extends through a profile of the belt such that the belt is removable without removing the fluid line or the actuator.

17. The vehicle of claim 9, wherein the at least one of the piston and spider nut define a channel such that the nozzle is fluidly coupled to the chamber via the channel when the drive clutch is shifted to engage the belt and wherein the channel is positioned to vent to atmosphere when the drive clutch is at a zero shift position.

18. The vehicle of claim 8, wherein the continuously variable transmission includes:

a chamber defined between only the piston and cylinder; and a nozzle of the actuator coupled to the piston and fluidly coupled to the chamber.

19. The vehicle of claim 17, wherein the actuator is a removeable cartridge such that the actuator and pressurized fluid source does not require bleeding when reinstalled.

* * * * *